(12) United States Patent
Nakamura et al.

(10) Patent No.: US 8,139,291 B2
(45) Date of Patent: Mar. 20, 2012

(54) IMAGE BLUR PREVENTION ACTUATOR AND LENS UNIT AND CAMERA EQUIPPED THEREWITH

(75) Inventors: Kenichi Nakamura, Saitama (JP); Hiroshi Otsuka, Saitama (JP)

(73) Assignee: Tamron Co., Ltd., Saitama (JP)

( * ) Notice: Subject to any disclaimer, the term of this patent is extended or adjusted under 35 U.S.C. 154(b) by 942 days.

(21) Appl. No.: 12/153,564

(22) Filed: May 21, 2008

(65) Prior Publication Data

US 2008/0291540 A1    Nov. 27, 2008

(30) Foreign Application Priority Data

May 21, 2007   (JP) .................................. 2007-134187
May 21, 2007   (JP) .................................. 2007-134188

(51) Int. Cl.
    *G02B 27/64*      (2006.01)
(52) U.S. Cl. ................ 359/557; 396/55; 348/208.11
(58) Field of Classification Search .................. None
See application file for complete search history.

(56) References Cited

U.S. PATENT DOCUMENTS

| | | | |
|---|---|---|---|
| 6,064,827 A * | 5/2000 | Toyoda | ........................... 396/55 |
| 6,631,042 B2 | 10/2003 | Noguchi | |
| 7,804,645 B2 | 9/2010 | Morita et al. | |
| 2006/0082674 A1* | 4/2006 | Noji | .............................. 348/360 |
| 2006/0109372 A1 | 5/2006 | Noji | |
| 2008/0181594 A1* | 7/2008 | Noguchi | ........................ 396/55 |
| 2008/0231955 A1* | 9/2008 | Otsuka | ........................ 359/557 |

FOREIGN PATENT DOCUMENTS

| | | |
|---|---|---|
| JP | 08-184870 A | 7/1996 |
| JP | 2001-290184 | 10/2001 |
| JP | 2004-170599 A | 6/2004 |
| JP | 2006-119249 | 5/2006 |
| JP | 2006-149105 A | 8/2006 |
| WO | 2006075545 A1 | 7/2006 |

* cited by examiner

*Primary Examiner* — Lee Fineman
(74) *Attorney, Agent, or Firm* — Jacobson Holman PLLC

(57) ABSTRACT

An actuator for moving an imaging lens to prevent blurring of an image includes a fixed portion; a movable portion attached to the imaging lens; a plurality of spherical bodies sandwiched between the movable portion and the fixed portion, supporting the movable portion; a drive means; fixed portion drop prevention walls and movable portion drop prevention walls, erected so as to respectively surround each of the spherical bodies and prevent the spherical bodies from dropping; fixed portion contact walls and moving portion contact walls formed contiguously with these drop prevention walls such that when the movable portion is moved to a predetermined locking position, the spherical bodies contact it; and a controller for moving the movable portion to a locking position by rotating the movable portion around the optical axis, thereby positioning each of the spherical bodies.

14 Claims, 17 Drawing Sheets

IMAGE BLUR PREVENTION ACTUATOR AND LENS UNIT AND CAMERA EQUIPPED THEREWITH

BACKGROUND OF THE INVENTION

1. Field of the Invention

The present invention relates to an actuator and a lens unit and camera equipped therewith, and more particularly to an actuator and a lens unit and camera equipped therewith in which imaging lenses are moved within a plane perpendicular to the optical axis thereof to prevent image blurring.

2. Description of Related Art Including Information Disclosed Under 37 CFR §§1.97 and 1.98

JP 2001-290184 (Patent Document 1) describes an observation device. In this observation device a movable piece, to which a blur compensation lens is attached, is supported by three balls (spherical bodies), and image blurring is compensated by moving the blur compensation lens within a plane perpendicular to the optical axis. The balls supporting the movable piece are disposed inside a square limiting portion (walls). Furthermore, the observation device translationally moves the movable piece up to a maximum degree of movement, causing each ball to contact a limiting portion, after which a reset operation is performed to return the movable piece by a predetermined distance. Each ball is positioned by this reset operation within a certain range which is returned by a predetermined distance from the position at which contact was made with a limiting piece.

JP 2006-119249 (Patent Document 2) describes an actuator used to prevent image blurring. In this actuator, a moving frame is caused to rotate around an optical axis up to a locking position, and the moving frame is locked by engagement between a protuberance formed on the periphery of the moving frame and a cam-shaped piece disposed corresponding thereto.

The actuator described in JP 2006-119249 has the advantage that the moving frame can be locked without providing a special actuator for the purpose of locking the moving frame.
Patent Document 1: JP 2001-290184
Patent Document 2: JP 2006-119249

3. Problems to Be Solved by the Invention

However, in the observation device described in JP 2001-290184, the movable piece to which the blur compensation lens is attached is caused to move translationally to the maximum degree of movement during the reset operation, causing the problem that images formed during the reset operation are significantly blurred.

A further problem arises because in the observation device a special reset operation must be executed in order to position the balls (spherical bodies) within a certain range; therefore the observation device cannot be used during the period of the reset operation.

The actuator described in JP 2006-119249 has a further problem in that the protuberance for locking the moving frame (movable portion) and the cam-shaped piece used to engage therewith must be disposed on the outer perimeter of the moving frame, thereby increasing the outside diameter of the actuator.

Also, in the actuator the steel balls (spherical bodies) which lock the moving frame are not themselves locked even when the moving frame (movable portion) is locked, therefore when a shock force acts on a locked moving frame, there is a risk that the steel balls will fall out.

Furthermore, because in the actuator the steel balls are not positioned even when the moving frame (movable portion) is locked, it is difficult to reliably position the steel balls to an appropriate location when recovered to image blur prevention control.

BRIEF SUMMARY OF THE INVENTION

Therefore the present invention has the object of providing an actuator and lens unit and camera furnished therewith capable of positioning spherical bodies at a predetermined position without causing significant blurring of a formed image.

The present invention has the further object of providing an actuator and lens unit and camera furnished therewith capable of positioning spherical bodies at a predetermined position without executing any special operation.

The present invention has the further object of providing an actuator and lens unit and camera furnished therewith capable of locking a movable portion without increasing outside diameter.

The present invention has the further object of providing an actuator and lens unit and camera furnished therewith capable of locking spherical bodies when a movable portion is locked.

The present invention has the further object of providing an actuator and lens unit and camera furnished therewith capable of positioning spherical bodies when a movable portion is locked.

The present invention is an actuator for moving an imaging lens within a plane perpendicular to the optical axis thereof to prevent blurring of an image, comprising a fixed portion; a movable portion attached to the imaging lens; a plurality of spherical bodies sandwiched between the movable portion and the fixed portion, supporting the movable portion such that it can be moved; a drive means for driving the movable portion with respect to the fixed portion, causing the movable member to move rotationally and translationally; fixed portion drop prevention walls provided on the fixed portion so as to surround each of the spherical bodies and prevent the spherical bodies from dropping; fixed portion contact walls formed contiguously with these fixed portion drop prevention walls such that when the movable portion is moved to a predetermined locking position, the spherical bodies make contact therewith; movable portion drop prevention walls provided on the movable portion so as to surround each of the spherical bodies and prevent the spherical bodies from dropping; movable portion contact walls formed contiguously with the movable portion drop prevention walls such that the spherical bodies contact therewith when the movable portion is moved to the locking position; and a control means for controlling the drive means, moving the movable portion to the locking position by rotating the movable portion around the optical axis, thereby positioning each of the spherical bodies and restoring the movable portion to a predetermined image blur prevention control operational center position by rotating the movable portion by a predetermined angle from the locking position.

In the present invention thus constituted, the movable portion to which the imaging lenses are attached is supported by a plurality of spherical bodies so as to be able to move; a drive means drives the movable portion with respect to a fixed portion, thereby moving it rotationally and translationally. Fixed portion drop prevention walls and fixed portion contact walls formed contiguously with these fixed portion drop prevention walls are provided on the fixed portion so as to surround each respective spherical body. Also, movable portion drop prevention walls and movable portion contact walls formed contiguously with these movable portion drop prevention walls are provided on the movable portion so as to surround each respective spherical body. By controlling the drive means to cause the movable portion to rotate around the optical axis, a control means causes the movable portion to move to the locking position, thereby positioning each of the spherical bodies. By causing the movable portion to rotate by a predetermined angle from the locking position, the control means causes the movable portion to be restored to a predetermined image blur prevention control operational center position.

In the present invention thus constituted, each spherical body is positioned by moving the movable portion to which the imaging lenses are attached, therefore the formed image can be prevented from significantly blurring when positioning the spherical bodies. Also, in the present invention thus constituted the spherical bodies are positioned when the movable portion is moved to the locking position, therefore the spherical bodies can be positioned without executing any particular operation, and the position of the spherical bodies can be maintained at an appropriate location when the movable portion is restored to a predetermined image blur prevention control operational center position.

In the present invention, the image blur prevention control operational center position is preferably positioned at essentially the center of a surface on which each spherical body is respectively surrounded by the fixed portion drop prevention walls and the movable portion drop prevention walls.

In the present invention thus constituted, at the image blur prevention control operational center position each spherical body is respectively positioned at essentially the center of a surface surrounded respectively by the fixed portion drop prevention wall and the movable portion drop prevention wall, therefore the surface surrounded by the fixed portion drop prevention walls and the movable portion drop prevention walls can be made narrower while preventing contact by each of the spherical bodies with each of the drop prevention walls. This allows the actuator to be made more compact.

In the present invention, at least either the fixed portion contact walls or the movable portion contact walls are preferably constituted such that the tip thereof tapers, and the spherical bodies contact at least two points or a predetermined area of the tapered portion.

In the present invention thus constituted, the spherical bodies contact at least either the fixed portion contact walls or the movable portion contact walls at least two points or at a predetermined area, therefore the spherical bodies can be reliably positioned.

In the present invention the fixed portion contact walls and the movable portion contact walls preferably protrude in mutually opposite directions essentially tangential to the perimeter of a circle centered on an optical axis.

In the present invention thus constituted, rotating the movable portion around an optical axis enables the interval between the fixed portion contact walls and the movable portion contact walls to be narrowed, thereby enabling the spherical bodies to be placed in contact with each of the contact walls.

In the present invention, the fixed portion drop prevention walls and the fixed portion contact walls, as well as the movable portion drop prevention walls and the movable portion contact walls, are respectively each formed in an approximately teardrop shape.

In the present invention thus constituted, the spherical bodies can be smoothly moved to a position at which they contact the fixed portion contact walls and the movable portion contact walls.

The present invention is an actuator for moving an imaging lens within a plane perpendicular to the optical axis thereof to prevent blurring of an image, comprising: a fixed portion; a movable portion to which the imaging lens is attached; at least three spherical bodies, sandwiched between the movable portion and the fixed portion and supporting the movable portion so that the movable portion is able to move; a drive means for translationally and rotationally moving the movable portion with respect to the fixed portion; fixed portion rolling area demarcation walls provided on the fixed portion so as to surround each of the respective spherical bodies, and to demarcate the rolling area within which the spherical bodies can roll in any direction; movable portion rolling area demarcation walls provided on the movable portion so as to surround each of the respective spherical bodies, and to demarcate the rolling area within which the spherical bodies can roll in any direction; at least two fixed portion restricted area demarcation walls formed to connect with the fixed portion rolling area, extending essentially tangentially relative to a circle centered on the optical axis and demarcating the positionally restricted area restricting the distance from the optical axis to the spherical bodies to a predetermined distance; and movable portion restricted area demarcation walls, corresponding to the respective fixed portion restricted area demarcation walls, for demarcating a positionally restricted area extending essentially tangentially to a circle centered on the optical axis so as to connect to the movable portion rolling area.

In the present invention thus constituted, the movable portion to which the imaging lenses are attached is supported by at least three spherical bodies so as to be movable with respect to the fixed portion. Each spherical body is sandwiched between the inside rolling area of the fixed portion roll area demarcation walls provided on the fixed portion, and the inside rolling area of the movable portion rolling area demarcation walls provided on the movable portion. At least two positionally restricted areas extending in a direction tangential to a circle around the optical axis are demarcated by the fixed portion restricted area demarcation walls and the movable portion restricted area demarcation walls so as to connect with these rolling areas.

In the present invention thus constituted, movement of the movable portion in the radial direction of a circle centered on the optical axis is restricted by at least two points due to the sandwiching of the spherical bodies in at least two positionally restricted areas, therefore translational movement of the movable portion is locked. The movable portion can thus be locked without increasing the outside diameter of the actuator.

The present invention preferably further comprises straight fixed portion adjustment area demarcation walls demarcating a fixed portion adjustment area, connected to and extending from the fixed portion rolling area, as well as movable portion adjustment area demarcation walls demarcating a movable portion adjustment area, connected to and extending from the movable portion rolling area; at least either the fixed portion adjustment area or the movable portion adjustment area is demarcated so as to intersect the perimeter of a circle centered on the optical axis.

In the present invention thus constituted, because the fixed portion adjustment area and/or the movable portion adjustment area intersects the perimeter of a circle centered on the optical axis, the distance from the spherical bodies sandwiched between the fixed portion adjustment area and the movable portion adjustment area to the optical axis can be made variable. A margin of error in the positionally restricted area position and dimensions can thus be tolerated while still reliably positioning the spherical bodies sandwiched between the fixed portion adjustment area and the movable portion adjustment area.

In the present invention there are preferably three sets of fixed portion rolling area demarcation walls and movable portion rolling area demarcation walls; of these, positionally restricted areas are formed in two sets, and a fixed portion adjustment area and a movable portion adjustment area are formed in the other set.

Such a constitution allows for support of the movable portion at three points without looseness.

In the present invention, the surface contacting the spherical bodies surrounded by the fixed portion restricted area demarcation walls or the movable portion restricted area demarcation walls preferably has a curved surface with essentially the same curvature radius as the outer surface of the spherical bodies.

In the present invention thus constituted, in the state wherein the spherical bodies are positioned in the various positionally restricted areas, the surface area contacting the spherical bodies can be increased, therefore the pressure of that contact can be reduced.

The present invention further comprises a rotational locking means which, when the spherical bodies are positioned in the positionally restricted areas of the fixed portion and the movable portion, locks rotation of the movable portion relative to the fixed portion.

In the present invention thus constituted, because the rotational locking means locks the rotation of the movable portion with respect to the fixed portion, the movable portion can be maintained in a state in which translational movement thereof is stopped by each of the positionally restricted areas.

The lens unit in the present invention comprises a lens barrel, a plurality of imaging lenses contained within the lens barrel, and the actuator of the present invention, wherein a portion of these imaging lenses are attached to the movable portion.

Furthermore, the camera of the present invention comprises a camera main unit and the lens unit of the present invention.

Effect of the Invention

The actuator and lens unit and camera equipped therewith of the present invention can position spherical bodies at a predetermined position without significantly causing a formed image to blur.

The actuator and lens unit and camera equipped therewith of the present invention are capable of positioning the spherical bodies at predetermined positions without executing special operations.

The actuator and lens unit and camera equipped therewith of the present invention are capable of locking the movable portion without enlarging the outside diameter.

DETAILED DESCRIPTION OF THE INVENTION

Next we discuss embodiments of the present invention with reference to the attached figures.

Figure 1:
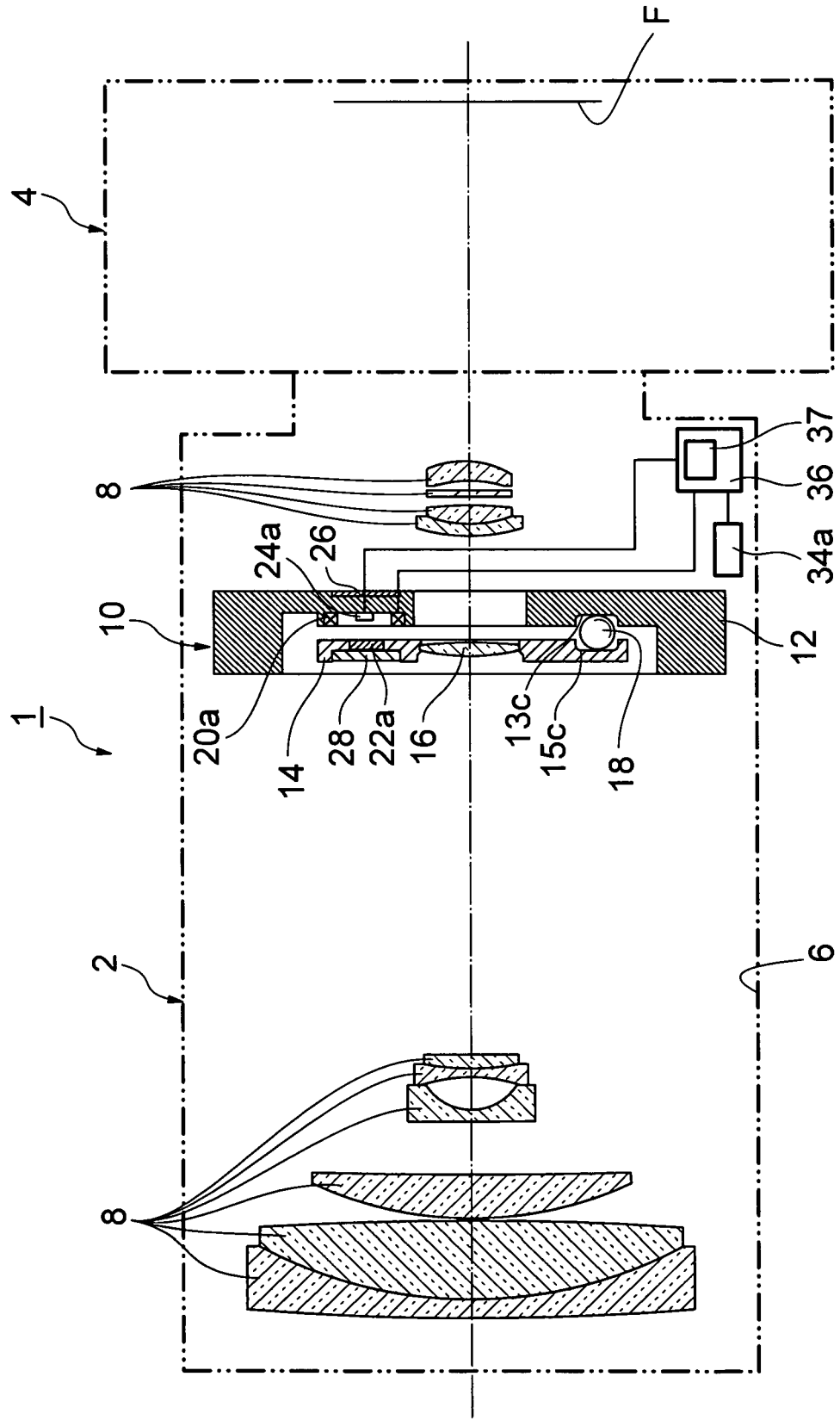
FIG. 1
A cross section of a camera according to an embodiment of the present invention.

First, referring to FIGS. 1 through 11, we discuss a camera according to a first embodiment of the present invention. FIG. 1 is a cross section of a camera according to a first embodiment of the present invention.

As shown in FIG. 1, the camera 1 of the first embodiment of the present invention comprises a lens unit 2 and a camera main unit 4. The lens unit 2 comprises a lens barrel 6, a plurality of imaging lenses 8 disposed within the lens barrel, an actuator 10 for moving an image blur compensation lens 16 from among the imaging lenses within a predetermined plane, and gyros 34a and 34b serving as a vibration detection means for detecting vibration in the lens barrel 6 (only 34a is shown in FIG. 1).

The lens unit 2 is attached to the camera main unit 4 and forms an image of light incident on a film surface F.

The approximately circular lens barrel 6 holds within it a plurality of imaging lenses 8, and implements focus adjustment by moving a portion of the imaging lenses 8.

The camera 1 of the first embodiment of the present invention detects vibration using the gyros 34a and 34b, operates the actuator 10 based on the vibration detected, thereby operating the image blur compensation lens 16 and stabilizing the image focused on the film surface F in the camera main unit 4. In the present embodiment, piezoelectric oscillator gyros are used for gyros 34a and 34b. Note that in the present embodiment the image blur compensation lens 16 comprises a single lens, but lens groups of multiple lenses may also be used to stabilize an image.

Figure 2:
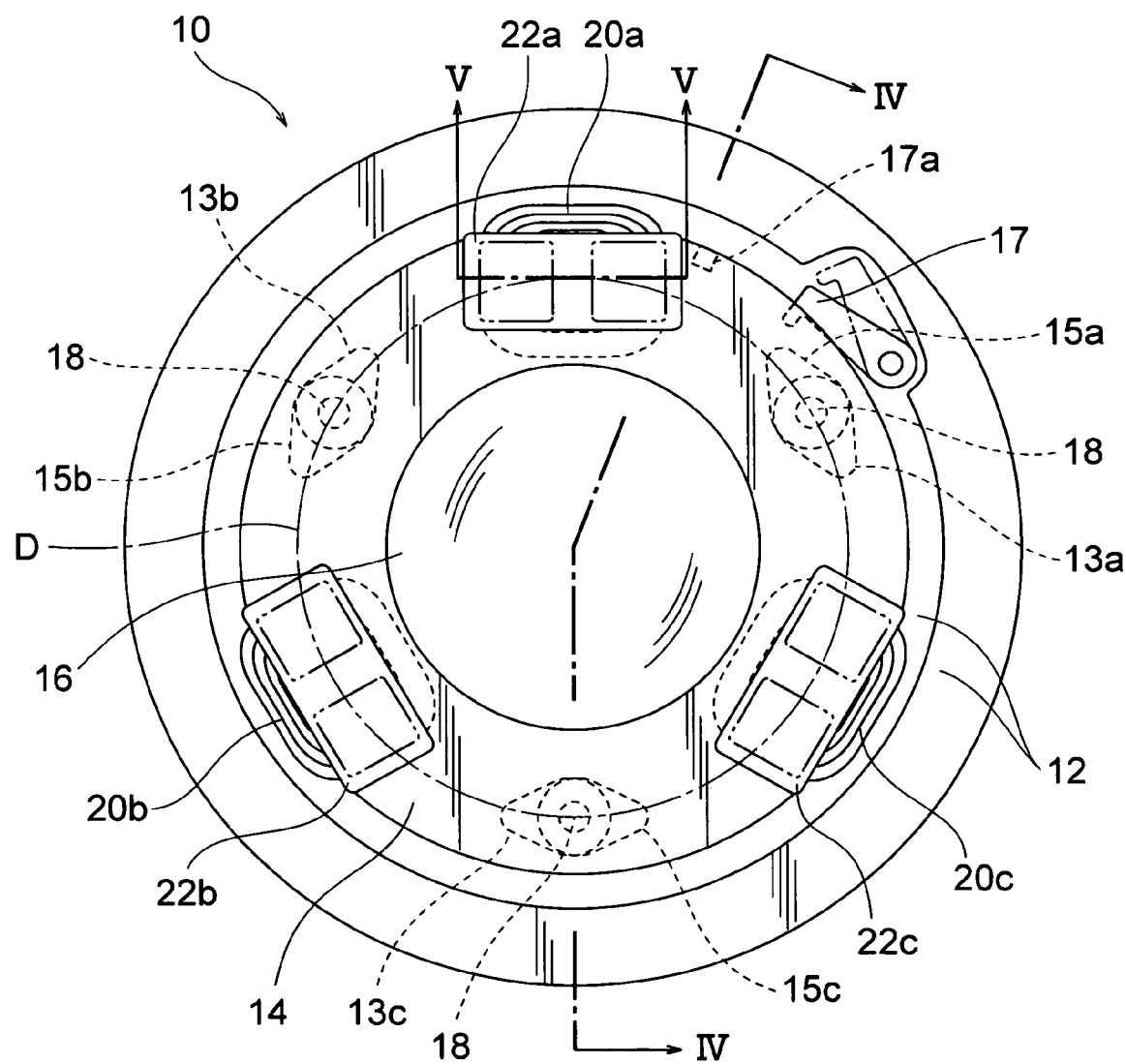
FIG. 2
A front elevation of an actuator with a moving frame at the operational center position of the image blur compensation control.
Figure 3:
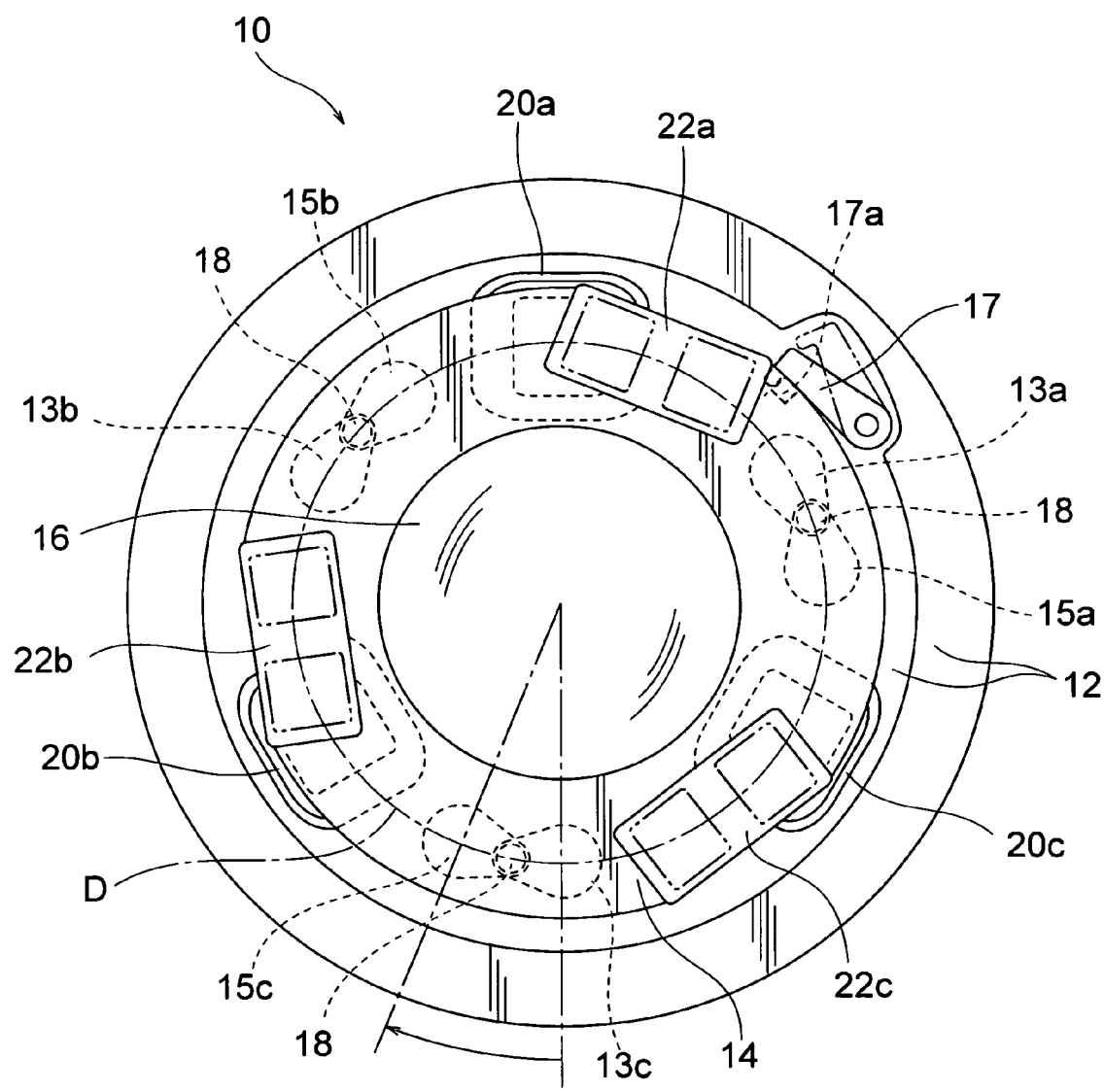
FIG. 3
A front elevation of an actuator with a moving frame in the locking position.
Figure 4:
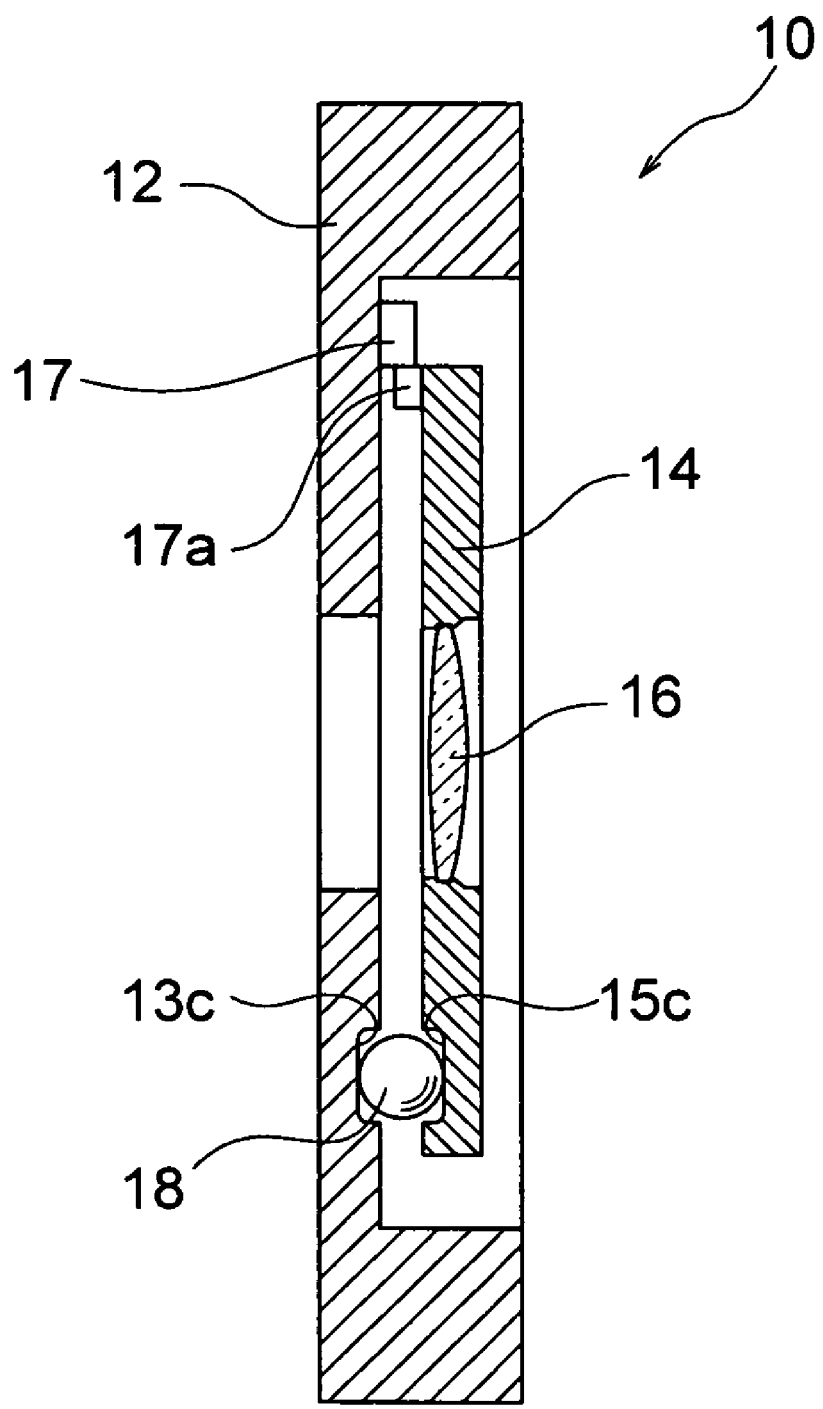
FIG. 4
A side elevation cross section along line IV-IV in FIG. 3.

Next, referring to FIGS. 2 through 5, we discuss the constitution of the actuator 10. FIG. 2 is a front elevation of the actuator 10 when the moving frame is at the image blur prevention control operational center position. FIG. 3 is a front elevation of the actuator 10 when the moving frame is in the locking position. Additionally, FIG. 4 is a side elevation cross section along line IV-IV in FIG. 3, and FIG. 5(a) is a side elevation cross section along line V-V in FIG. 2. FIG. 5(b) is an oblique view showing the state of magnetization of the drive magnets.

As shown in FIGS. 2 through 5, the actuator 10 comprises a fixed frame 12, which is fixed portion affixed within the lens barrel 6; a moving frame, which is a movable portion supported to as to be movable with respect to the fixed frame 12; and three steel balls serving as spherical bodies to support the moving frame.

Furthermore, the actuator 10 comprises three drive coils 20a, 20b, and 20c attached to the fixed frame 12; and three drive magnets 22a, 22b, and 22c on the moving frame attached to the respectively corresponding drive coils 20a, 20b, and 20c.

As shown in FIG. 5(a), in order to cause the moving frame 14 to be drawn to the fixed frame 12 by the magnetic force of the drive magnets 22a, 22b, and 22c, the actuator 10 has a drawing yoke 26 attached to the fixed frame 12, and a back yoke 28 attached to the rear of the drive magnet so as to effectively direct the magnetic force of the drive magnet toward the fixed frame 12. Note that the drive coils 20a, 20b, and 20c and the three drive magnets 22a, 22b, and 22c attached at positions corresponding thereto together form a linear motor, functioning as a drive means to move the moving frame 14 with translational motion, as well as rotation, relative to the fixed frame 12.

Figure 5:
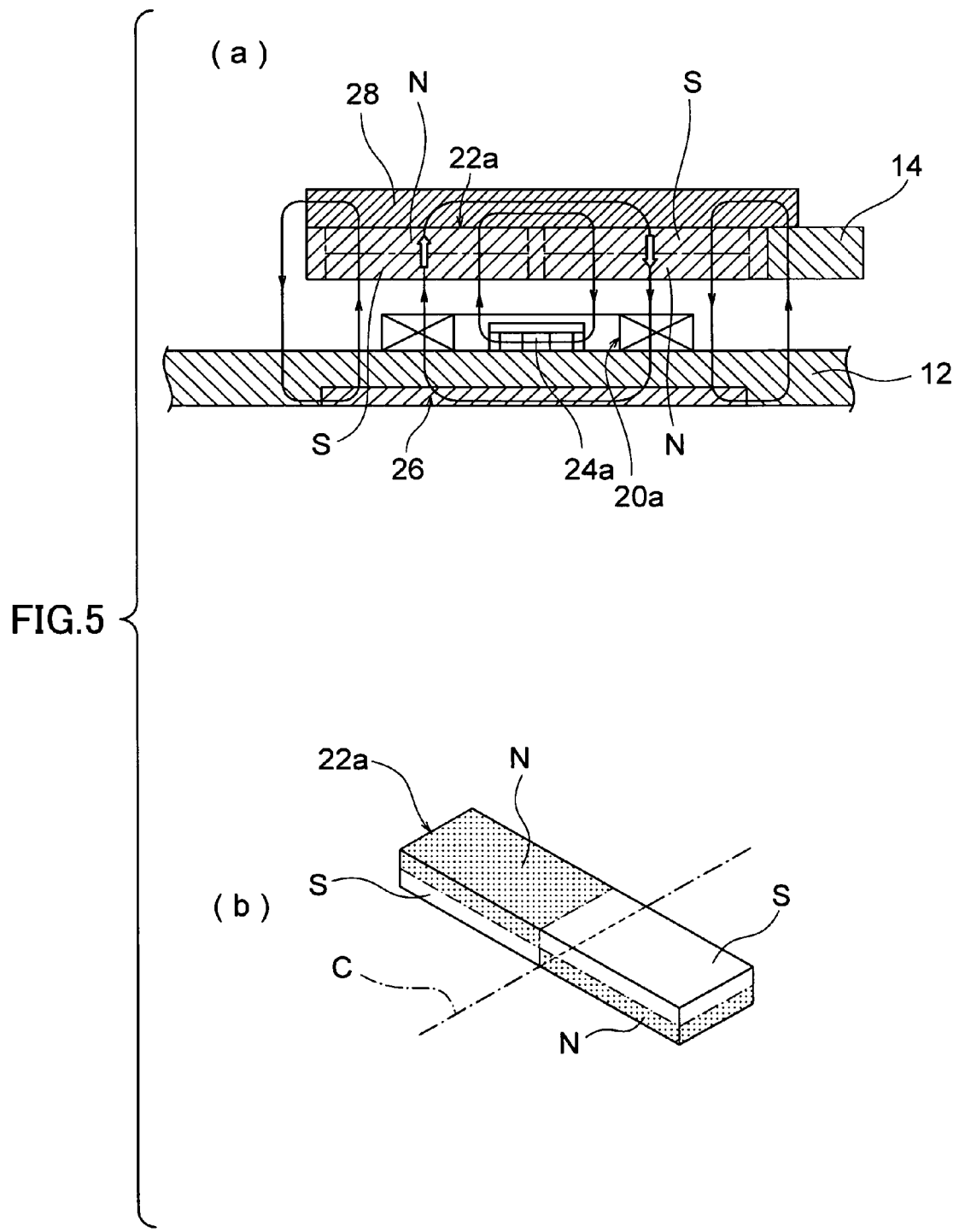
FIG. 5
A side elevation cross section along line V-V in FIG. 2; (b) a perspective view showing the state of magnetization of a drive magnet.

Furthermore, as shown in FIG. 5(a), Hall elements 24a, 22b, and 22c, which are magnetic sensors, are disposed on the inside of the windings of each of the drive coils 20a, 20b, and 20c (only 24a is shown in FIG. 5). Each Hall element 24a, 22b, and 22c detects the magnetism of each of the drive magnets 22a, 22b, and 22c disposed to face the respective Hall elements, thereby detecting the position of the moving frame 14 relative to the fixed frame 12. These Hall elements 24a, 22b, and 22c and drive magnets 22a, 22b, and 22c constitute position detection means.

As shown in FIG. 1, the actuator 10 has a controller 36, which is a controlling means for controlling the current sourced to each of the drive coils 20a, 20b, and 20c based on the vibration detected by the gyros 34a and 34b, and on moving frame 14, positional information detected by each of the drive coils 20a, 20b, and 20c. Furthermore, a locking position movement means 37 for moving the moving frame 14 to the locking position, which is the target position, and a locking direction biasing means 47 for outputting a signal for biasing the moving frame 14 toward the locking position, are built into the controller 36.

The actuator 10 causes the moving frame 14 to move within a plane parallel to the film surface F relative to the fixed frame 12 affixed to the lens barrel 6, thereby moving the image blur compensation lens 16 attached to the moving frame 14, thus driving the moving frame 14 in such a way that the image formed on the film surface F is not distorted even if the lens barrel 6 vibrates.

The fixed frame 12, as shown in FIG. 2, has a donut shape formed by a rim around a circle. Also, fixed frame receiving portions 13a, 13b, and 13c, which are concavities for receiving each of the steel balls 18, are formed on the fixed frame 12. Details about these fixed frame receiving portions are discussed below. Furthermore, a locking hook 17, which is a rotational locking means for locking the moving frame 14, is rotatably attached to the fixed frame 12. This locking hook 17 is joined to a solenoid (not shown), and is rotated in order to lock the moving frame 14.

The moving frame 14, as shown in FIG. 2, has an approximately donut shape, and is disposed so as to be surrounded by the edge of the fixed frame 12 within the fixed frame 12. An image blur compensation lens 16 is attached at the center opening of the moving frame 14. Moving frame receiving portions 15a, 15b, and 15c, which are concavities for receiving each of the steel balls 18, are formed on the moving frame 14. Details of the moving frame receiving portions are discussed below. Additionally, a locking protuberance 17a, which engages the locking hook 17 during locking, is formed at the position corresponding to the locking hook 17 on the moving frame 14.

As shown in FIG. 4, the steel balls 18 are respectively disposed between each of the fixed frame receiving portions 13a, 13b, and 13c formed on the fixed frame 12 and each of the moving frame receiving portions 15a, 15b, and 15c formed on the moving frame 14. Three of the steel balls 18, as shown in FIGS. 2 and 3, are respectively separated by a center angle of 120°, so as each to be positioned between the respective drive coils. Each steel ball 18 is disposed within the receiving portions formed between the fixed frame 12 and the moving frame 14; the moving frame 14 is drawn to the fixed frame 12 by a drive magnet 22, therefore each steel balls 18 is sandwiched between the fixed frame 12 and the moving frame 14. The moving frame 14 is thus supported on a plane parallel to the fixed frame 12, and each steel ball 18 rolls while being sandwiched, thereby permitting translational and rotational movement of the moving frame 14 in any desired direction relative to the fixed frame 12.

In the present embodiment, steel spheres are used as the steel balls 18, but the steel balls 18 do not necessarily have to be spheres. That is, any steel balls 18 may be used so long as the portion making contact between the fixed frame 12 and the moving frame 14 during the operation of the actuator 10 is approximately a spherical surface. Note that in the present Specification, this type of shape is referred to as a spherical body.

The three drive coils 20a, 20b, and 20c are respectively disposed on the fixed frame 12. The centers of these drive coils 20a, 20b, and 20c are respectively disposed on a perimeter centered on the optical axis of the lens unit 2. In the present embodiment, the drive coil 20a is disposed at a position vertically above the optical axis, and drive coils 20b and 20c are disposed at intervals separated by a center angle of 120° each relative to the drive coil 20a. In other words, the drive coils 20a, 20b, and 20c are disposed at equal intervals on a circle centered on the optical axis. The windings of the drive coils 20a, 20b, and 20c are respectively wound in a rectangular shape with rounded corners, whereby the center line of that rectangle coincides with the radial direction of the circle.

The drive magnets 22a, 22b, and 22c each have a rectangular shape, and are set into the moving frame 14. The drive magnets 22a, 22b, and 22c are also positioned at positions corresponding to each of the drive magnets 22a, 22b, and 22c on the circumference of the moving frame 14. Note that in the present Specification the "position corresponding to the drive coil" means the position at which the effect of the magnetic fields formed by the drive coils is substantially imparted.

The three drawing yokes 26 are attached to the rear side of each of the drive coils on the fixed frame 12, i.e. to the opposite side of the moving frame 14. Each drawing yoke 26 is drawn by the magnetic force of the drive magnets 22a, 22b, and 22c positioned in correspondence thereto, and the moving frame 14 is thus drawn to the fixed frame 12. Note that in the present embodiment, the fixed frame 12 is composed of a non-magnetic material so that the magnetic field lines of the drive magnet efficiently reach the drawing yokes 26.

The back yokes 28 have an approximately rectangular shape, and are respectively disposed at the rear side of the three drive magnets. As shown in FIG. 5(a), by attaching each of the back yoke 28 to the rear sides of each of the drive magnets, i.e. to the reverse side of each of the drive coils, the flux of each of the drive coils is efficiently directed toward the fixed frame 12 (in FIGS. 2 and 3 the back yokes 28 are removed).

Next, referring to FIG. 5, we discuss the magnetic force imparted by the drive magnets. The approximately rectangularly formed drive magnets 22a, 22b, and 22c, back yokes 28, and drawing yokes 26 are each disposed so that each of their long sides and short sides overlaps. The drive coils 20a, 20b, and 20c are disposed so that their respective sides are parallel to the long sides and short sides of the rectangular back yoke 28. Furthermore, each drive magnet is oriented in such a way that the magnetization boundary line C, which is the boundary line between the magnetic poles thereof, matches the radial direction of the circle on which each of the drive magnets is disposed.

The drive magnet 22a, back yoke 28, and drawing yoke 26 thus form a magnetic circuit, forming magnetic force lines as shown by the arrows in FIG. 5(a). When current flows in the corresponding drive coil 20a, the drive magnet 22a receives a drive force in a direction tangential to the circle on which each of the drive magnets is disposed. Drive magnets 22b and 22b, back yoke 28, and drawing yokes 26, correlated in the same positional relationship, are also disposed relative to the other drive coils 20b and 20c.

Note that in the present Specification, the "magnetization boundary line C" refers to the magnetic pole boundary line which is magnetized when magnetization occurs such that the two ends of the drive magnet become respectively S and N poles. Therefore in the present embodiment the magnetization boundary line C is positioned to pass through the center point of the long side of the rectangular drive magnet. Additionally, as shown in FIG. 5(b), polarity also changes in the thickness direction of the drive magnets 22a, such that the lower left corner of 5(b) is an S pole; the lower right is an N pole, the upper left is an N pole, and the upper right is an S pole.

Figure 6:
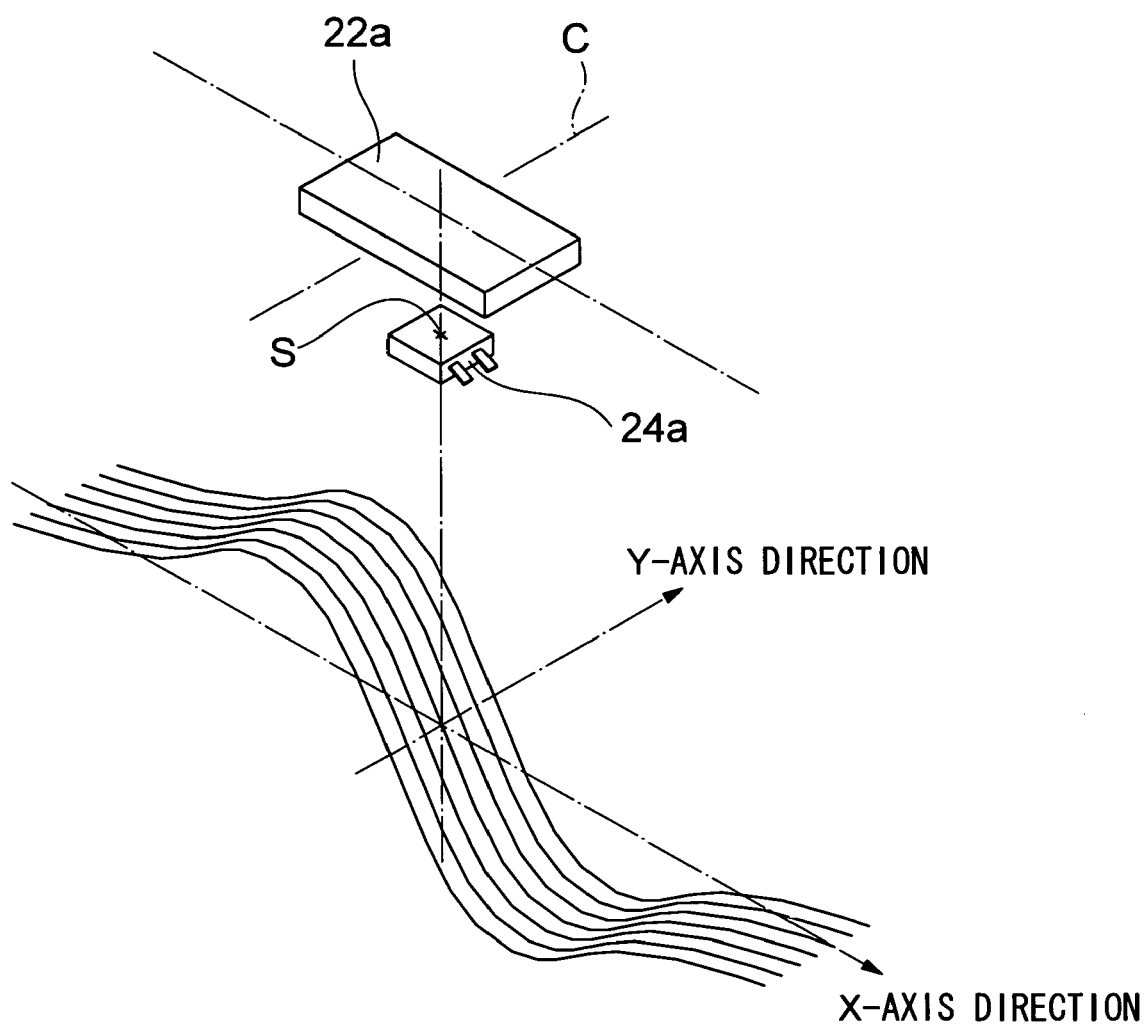
FIG. 6
A diagram explaining the relationship between the movement of a drive magnet and the signal output from a Hall element.
Figure 7:
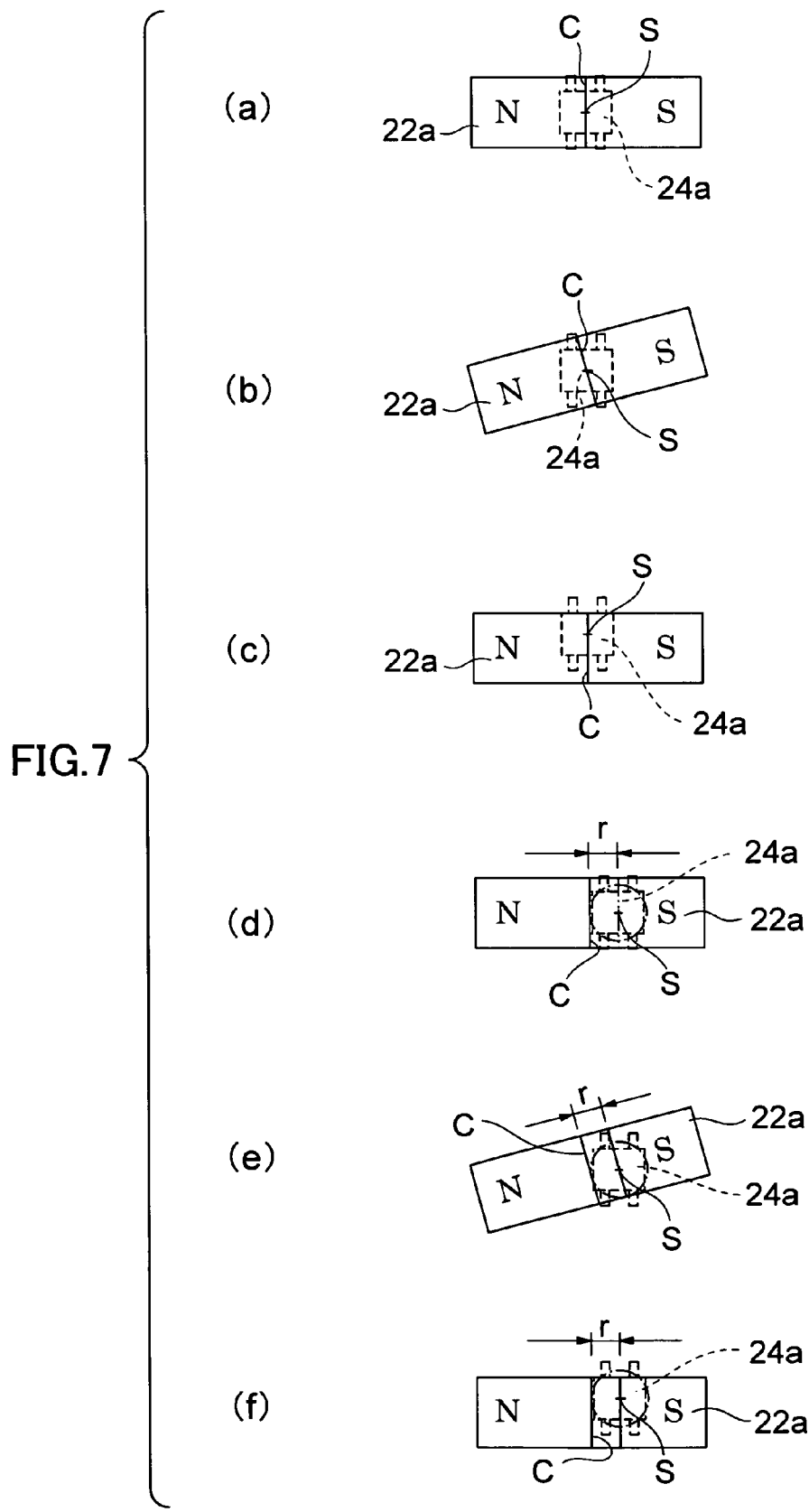
FIG. 7
A diagram explaining the relationship between the movement of a drive magnet and the signal output from a Hall element.

Next, referring to FIGS. 6 and 7, we discuss detection of the moving frame 14 position.

FIGS. 6 and 7 describe the relationship between the movement of the drive magnet 22a and the signals output from the Hall element 24a. As shown in FIG. 6, when the sensitivity center point S of the Hall element 24a is positioned on the drive magnet 22a magnetization boundary line C, the output signal from the Hall element 24a is zero. When the drive magnet 22a is moved together with the moving frame 14, and the sensitivity center point of the Hall element 24a separates from the drive magnet 22a magnetization boundary line, the output signal of the Hall element 24a changes. As shown in FIG. 6, when the drive magnet 22a moves in the direction perpendicular to the magnetization boundary line C, i.e. in the X axis direction, the Hall element 24a generates a sine wave. Therefore when the amount of movement is very small, the Hall element 24a emits a signal essentially proportional to the distance of movement by the drive magnet 22a. In the present embodiment, when the distance of movement of the drive magnet 22a is within about 3% of the length of the long side of the drive magnet 22a, the signal output from the Hall element 24a is essentially proportional to the distance between the Hall element 24a sensitivity center point S and the drive magnet 22a magnetization boundary line C. Also, in the present embodiment the actuator 10 is such that in the normal operating area the output of each Hall element operates in a manner which is essentially proportional to distance.

As shown in FIGS. 7(a) through (c), when the magnetization boundary line C of drive magnet 22a is positioned on the sensitivity center point S of Hall element 24a, the output signal from the Hall element 24a will be zero both when the drive magnet 22a rotates, as shown in FIG. 7(b), and when the drive magnet 22a moves toward the magnetization boundary line C. When, as shown in FIGS. 7(d) through (f), the magnetization boundary line C of drive magnet 22a separates from the sensitivity center point S of Hall element 24a, a signal proportional to the distance r between the sensitivity center point S and the magnetization boundary line C is output from the Hall element 24a. Therefore if the distance r from the sensitivity center point S to the magnetization boundary line C is the same, then whether the drive magnet 22a is perpendicular to the magnetization boundary line C as shown in FIG. 7(a), or the drive magnet 22a moves translationally and rotationally as shown in FIG. 7(e), or it moves translationally in any desired direction, a signal of the same magnitude will be output from the Hall element 24a.

We have here discussed the Hall element 24a, but a similar signal is also output from the other Hall elements 24b and 24c based on the positional relationships between the drive magnets 22b and 22c corresponding thereto. It is therefore possible to identify the position to which the moving frame 14 has moved translationally and rotationally with respect to the fixed frame 12 based on the signal detected by each of the Hall elements 24a, 22b, and 22c.

Figure 8:
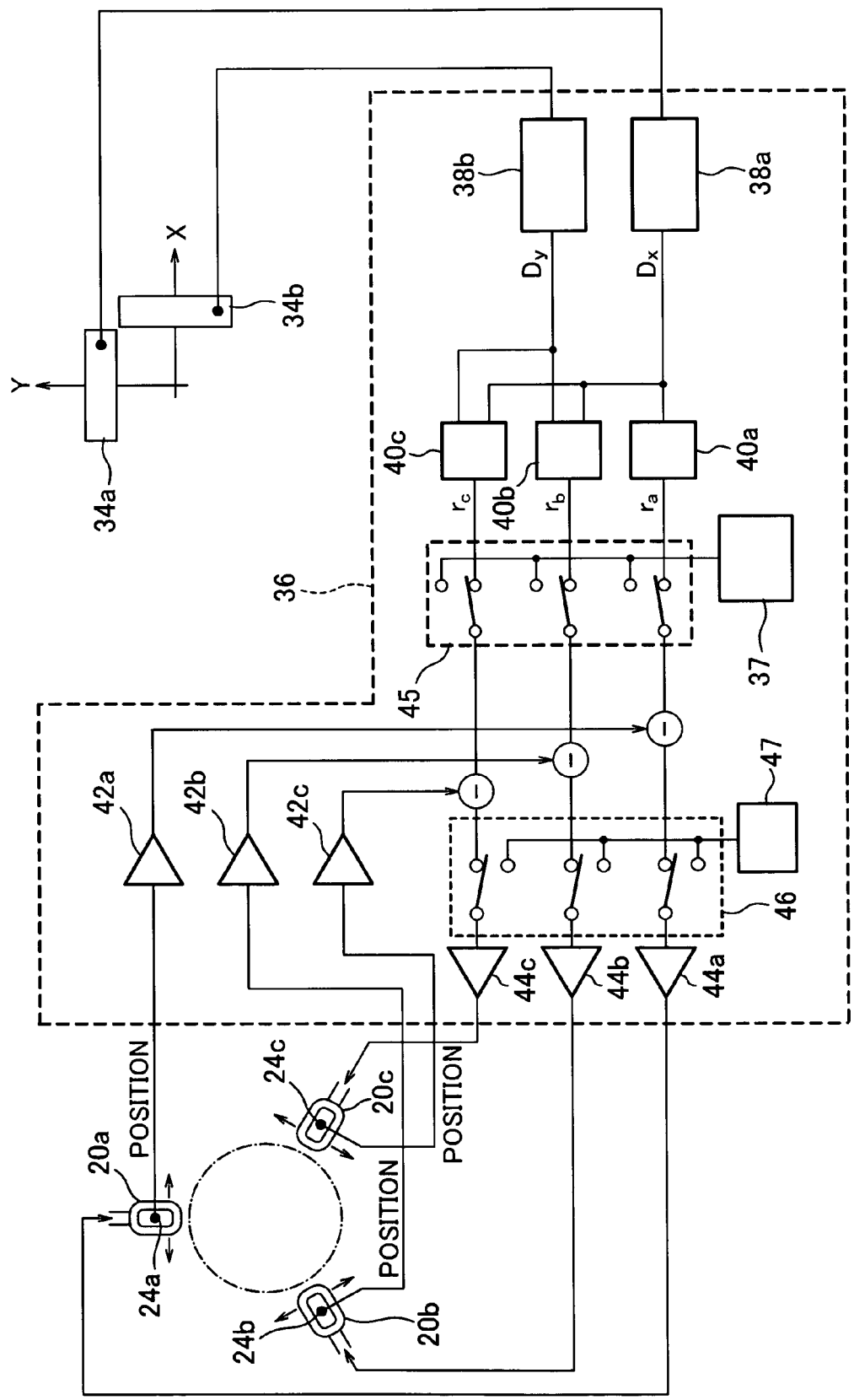
FIG. 8
A block diagram showing signal processing in a controller.

Next, referring to FIG. 8, we discuss image blur prevention control by the actuator 10. FIG. 8 is a block diagram showing signal processing in the controller 36. As shown in FIG. 8, vibration of the lens unit 2 is detected from moment to moment by the two gyros 34a and 34b and input to computing circuits 38a and 38b, which serve as lens position command signal generating means, and are built into the controller 36. In the present embodiment, the gyros 34a and 34b are constituted and positioned to respectively detect the angular velocities of the yawing and pitching motions of the lens unit 2.

Based on angular velocities input from moment to moment from the gyros 34a and 34b, the computing circuits 38a and 38b generate a lens position command signal which commands the position to which the image blur compensation lens 16 should move in a time sequence. That is, the computing circuit 38a performs a time integration of the angular velocity of the yawing motion detected by the gyro 34a to perform a predetermined optical characteristic compensation, thus generating the horizontal component Dx for the lens position command signal; similarly the computing circuit 38b performs a time integration of the angular velocity of the pitching motion detected by the gyro 34b to perform a predetermined optical characteristic compensation, thus generating the vertical component Dy for the lens position command signal. By moving the image blur compensation lens 16 from moment to moment in accordance with a lens position command signal obtained in this manner, the image focused on the film surface F within the camera main unit 4 is stabilized without distortion even when the lens unit 2 vibrates during photographic exposure.

A coil position command signal generating means built into the controller 36 is constituted to generate coil position command signals to each drive coil based on lens position command signals generated by the computing circuits 38a and 38b. The coil position command signal expresses the positional relationship between the drive coils 20a, 20b, and 20c and the drive magnets 22a, 22b, and 22c corresponding thereto when the image blur compensation lens 16 is moved to a position specified by the lens position command signal. That is, when each drive magnet is moved to a position relative to each coil commanded by the coil position command signal, the image blur compensation lens 16 is moved to the position commanded by the lens position command signal as a result. In the present embodiment, the drive coil 20a is disposed vertically above the optical axis, hence the coil position command signal ra relative to the drive coils 20a is equivalent to the horizontal component Dx of the lens position command signal output from the computing circuits 38a. Therefore a computing circuit 40a, which is the coil position command signal generating means which generates the coil position command signal relative to the drive coil 20a, outputs the output from the computing circuit 38a as is. In the meantime, the coil position command signals rb and rc relative to the drive coils 20b and 20c are generated by computation circuits 40b and 40c serving as coil position command signal generating means, based on the lens position command signal horizontal component Dx and vertical component Dy.

The degree of movement of the drive magnets relative to each drive coil as measured by the Hall elements 24a, 22b, and 22c is amplified by a predetermined multiplier by magnetic sensor amps 42a, 42b, and 42c. The drive circuits 44a, 44b, and 44c source a current to each of the drive coils 20a, 20b, and 20c proportional to the difference between each of the coil position command signals ra, rb, and rc output from the computing circuits 40a, 40b, and 40c, and the signals output from each of the magnetic sensor amps 42a, 42b, and 42c. Therefore when the difference between the coil position command signal and the output from each of the magnetic sensor amps disappears, i.e. when each drive magnet reaches the position commanded by the coil position command signal, current stops flowing in each of the drive coils and the drive force operating on the drive magnets goes to zero. Note that a selector switch 45 and a second selector switch 46 disposed between the computing circuits 40a, 40b, and 40c and drive circuits 44a, 44b, and 44c are positioned to connect directly with the computing circuits and the drive circuits at al times during the image blur prevention control mode.

Figure 9:
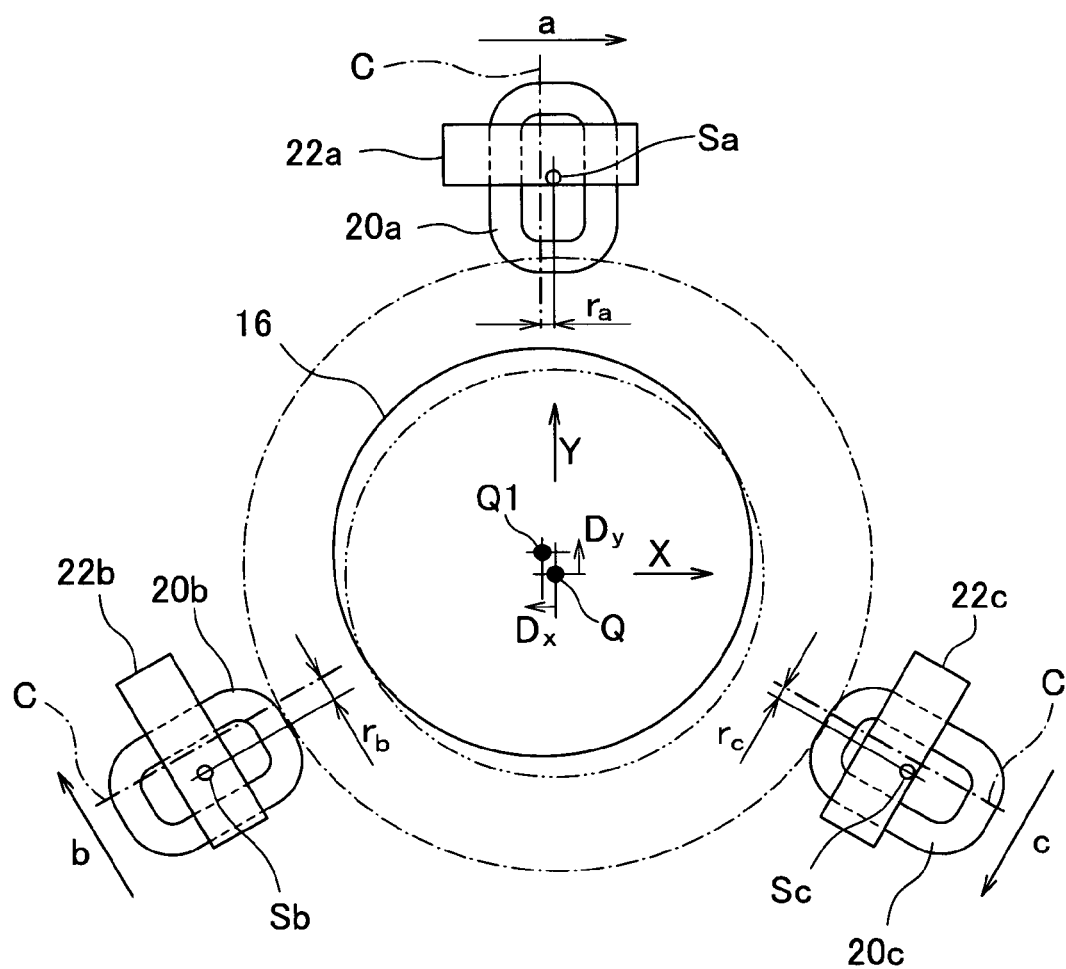
FIG. 9
A diagram of the positional relationship between a drive coil disposed on a fixed frame and a drive magnet disposed on a moving frame.

Next, referring to FIG. 9, we discuss the relationship between the lens position command signal and the coil position command signal when the moving frame 14 is moved translationally. FIG. 9 is a diagram depicting the positional relationship between the drive coils 20a, 20b, and 20c disposed on the fixed frame 12 and the drive magnets 22a, 22b, and 22c disposed on the moving frame 14. First, the center points of the three drive coils 20a, 20b, and 20c are respectively disposed at points Sa, Sb, and Sc on a circle of radius R with origin point Q. Furthermore, each Hall element 24a, 22b, and 22c is also respectively disposed so that the sensitivity center points S thereof are positioned at points Sa, Sb, and Sc. Moreover, when the moving frame 14 is at the operational center position, the center of the image blur compensation lens 16 and the optical axis of the imaging lenses 8 match, such that the center points of the magnetization boundary line C of each drive magnet corresponding to each of the drive coils are also positioned at points Sa, Sb, and Sc respectively, and each magnetization boundary line C is oriented in the radial direction of a circle centered on point Q. The moving frame 14 is translationally moved around this operational center position to execute image blur prevention control.

Next, assuming a horizontal axis X and a vertical axis Y, each originating at point Q, we consider the case in which the center point Q1 of the image blur prevention lens 16 moves translationally by Dy in the Y axis direction and −Dx in the X axis direction. When the moving frame 14 is moved in this manner, the magnetization boundary line C of each of the drive magnets 22a, 22b, and 22c is moved to a position shown by the dot and dash line in FIG. 9. We here define the distance between the drive magnet 22a magnetization boundary line C and the point Sa as ra, the distance between the drive magnet 22b magnetization boundary line C and the point Sb as rb, and the distance between the drive magnet 22c magnetization boundary line C and the point Sc as rc. These distances ra, rb, and rc correspond to the movement distance detected by each of the Hall elements 24a, 22b, and 22c when the image blur prevention lens 16 is moved by Dy in the Y axis direction and −Dx in the X axis direction. These distances ra, rb, and rc are uniquely defined relative to movement distances Dx and Dy in the X axis and Y axis directions. It is therefore sufficient in order to move the image blur prevention lens 16 by Dx and Dy respectively in the X and Y axis directions to apply distances ra, rb, and rc corresponding thereto as coil position command signals.

Defining the positive direction of the distances ra, rb, and rc as shown by the arrows a, b, and c in FIG. 9, the relationship of ra, rb, and rc to Dx and Dy is given by the following (Equation 1):

$$r_a = D_x$$
$$r_b = -\frac{1}{2}D_x + \frac{\sqrt{3}}{2}D_y$$
$$r_c = -\frac{1}{2}D_x - \frac{\sqrt{3}}{2}D_y$$

(Equation 1)

The computing circuits 40a, 40b, and 40c explained in FIG. 8 execute computations corresponding to the respective equations in Equation 1 above to generate position command signals for each coil.

Next we discuss the coil position command signal when the moving frame 14 is rotated. The moving frame 14 can be rotated by using the same value as the position command signal for each coil. That is, the coil position command signal required to turn the moving frame 14 by an angle θ [rad] is given as follows:

$$r_a = R\theta$$

$$r_b = R\theta$$

$$r_c = R\theta \quad \text{(Equation 2)}$$

Thus the turning of each drive magnet by the same distance in the tangential direction with respect to each drive coil results in the moving frame 14 being rotated around an optical axis while maintaining the optical axis of the image blur compensation lens 16 and the imaging lenses 8 optical axis in alignment.

Next, referring to FIGS. 1 through 8, we discuss the action of a camera 1 in an embodiment of the present invention. First, when the power switch (not shown) to the camera 1 hand vibration function is turned on, the actuator 10 provided on the lens unit 2 is activated. The gyros 34a and 34b attached to the lens unit 2 detect vibration in a predetermined frequency band from moment to moment, outputting those values to computing circuits 38a and 38b built into the controller. The gyro 34a outputs a yawing direction angular velocity signal for the lens unit 2 to the computing circuit 38a; the gyro 34b outputs a pitching direction angular velocity for the lens unit 2 to the computing circuit 38b. The computing circuit 38a performs a time integration of the input angular velocity signal, calculates a yawing angle, and adds a predetermined optical characteristic correction to generate the horizontal lens position command signal Dx. Similarly, the computing circuit 38b performs a time integration of the input angular velocity signal, calculates a pitching angle, and adds a predetermined optical characteristic correction to generate the horizontal lens position command signal Dy. By moving the image blur compensation lens 16 from moment to moment to a position specified by the lens position command signal output in a time sequence by the computing circuits 38a and 38b, the image focused on the film surface F in the camera main unit 4 is stabilized.

The horizontal lens position command signal Dx output by the computing circuit 38a is output via the computing circuit 40a as the coil position command signal ra relative to the drive coil 20a. Horizontal lens position command signal Dx and vertical lens position command signal Dy are input to the computing circuit 40b, and a coil position command signal rb relative to the drive coil 20b is generated based on the middle equation in Equation 1. Similarly, the lens position command signals Dx and Dy are input to the computing circuit 40c, and a coil position command signal rc is generated based on the bottom equation in Equation 1.

At the same time, the Hall element 24a corresponding to the drive coil 20a outputs a detection signal to a magnetic sensor amp 42a. The detection signal, amplified by the magnetic sensor amp 42a, is subtracted from the coil position command signal corresponding to the drive coil 20a, and a current proportional to this difference is output via a drive circuit 44a to the drive coil 20a. Similarly, a current proportional to the difference between the Hall element 24b detection signal and the coil position command signal rb is output via a drive circuit 44b to the drive coil 20b, and a current proportional to the difference between the Hall element 24c detection signal and the coil position command signal rc is output via a drive circuit 44c to the drive coil 20c.

A magnetic field proportional to the current is generated as a result of current flowing in each of the drive coils. This magnetic field causes each drive magnet, disposed in correspondence to each drive coil, to receive a drive force in a direction approaching a position designated by the coil position command signals ra, rb, and rc, such that the moving frame 14 is moved. When the drive magnets reach the position designated by the coil position command signal, the coil position command signal and the Hall element detection signal coincide, so the output of the drive circuit becomes zero, and the drive force becomes zero. When each drive magnet separates from the position designated by the coil position command signal through disturbances or changes or the like in the coil position command signal, current is again sourced to each drive coil, and each drive magnet returns to the position designated by the coil position command signal.

By moment to moment repetition of the operations, the image blur compensation lens 16 attached to the moving frame 14 carrying each of the drive magnet moves in such a way as to follow the lens position command signal. The image focused on the film surface F in the camera main unit 4 is thus stabilized.

Figure 10:
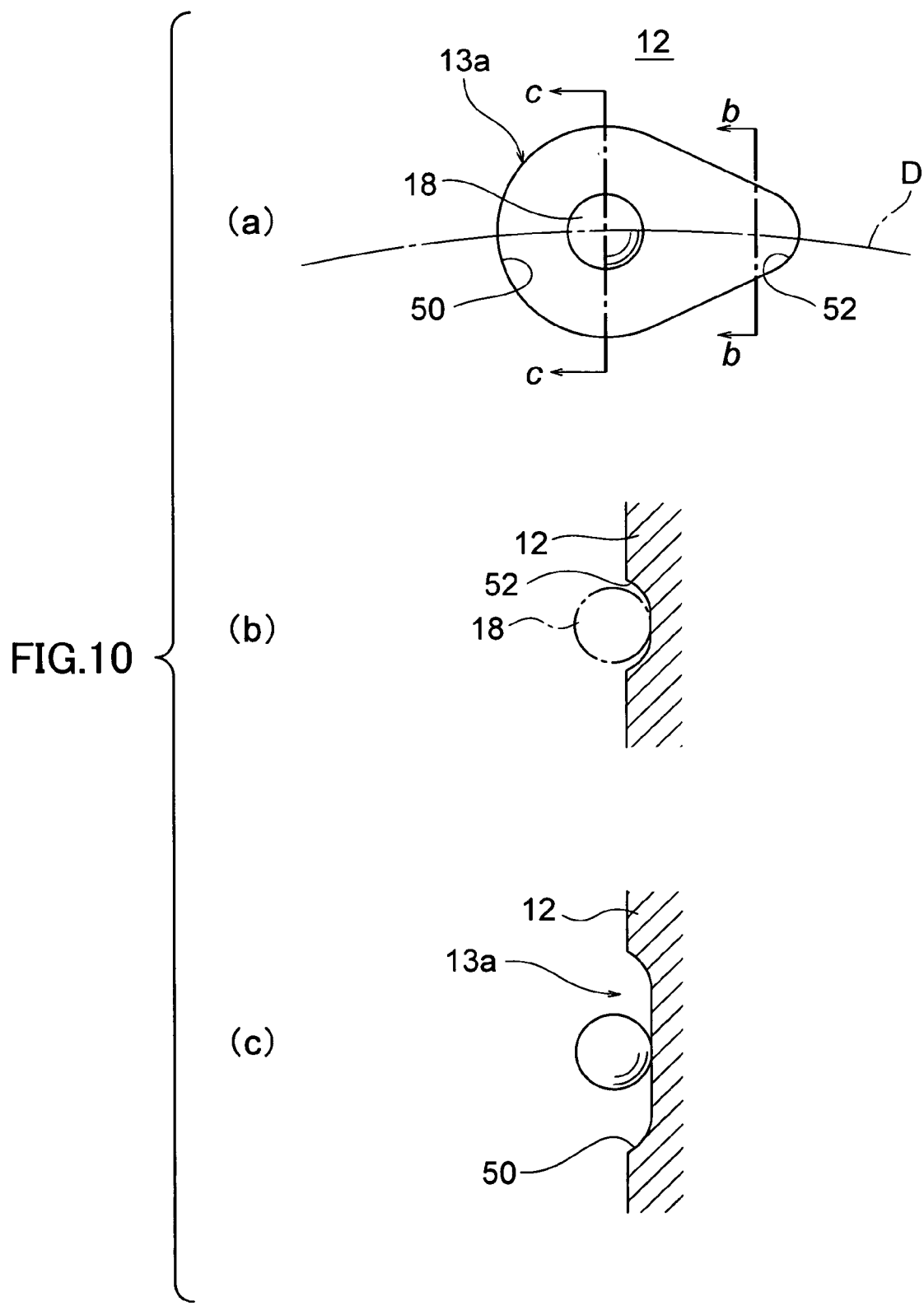
FIG. 10
A front elevation, (b) a cross section along line b-b in (a), and (c) a cross section along line c-c in (a) of a fixed frame receiving portion formed on a fixed frame.
Figure 11:
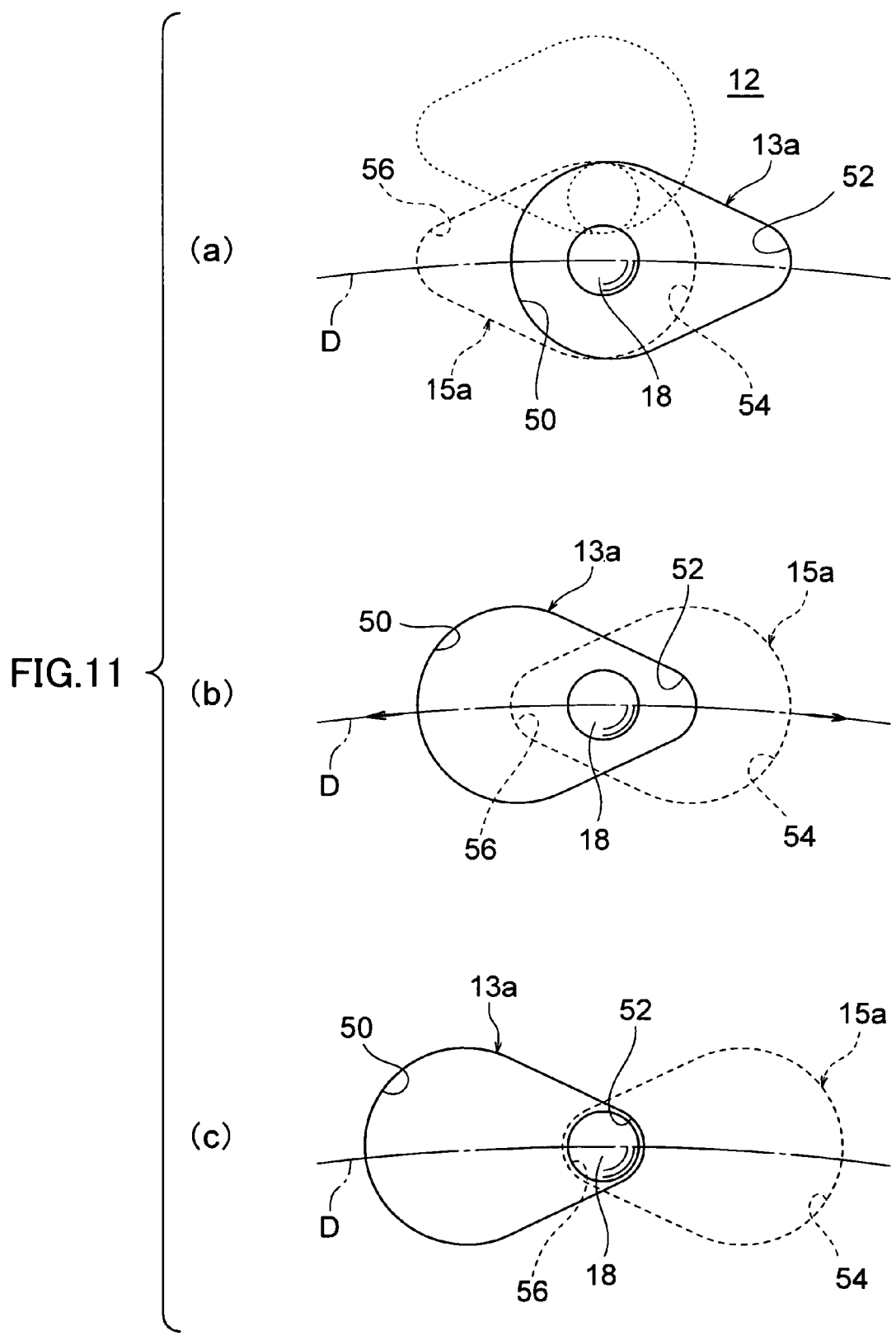
FIG. 11
A diagram showing the positional relationship between a fixed frame receiving portion formed on a fixed frame and a moving frame receiving portion formed on a moving frame; (a) depicts an image blur compensation control operational center position, (b) the state of movement to the locking position, and (c) the locking position.

Next, referring to FIGS. 10 and 11, we discuss the mechanism for positioning the steel balls supporting the actuator 10 moving frame 14 built into the camera 1 of the first embodiment of the present invention, as well as the action thereof. FIGS. 10 and 11 depict an expanded view of the fixed frame receiving portion and the moving frame receiving portion respectively formed on the fixed frame 12 and the moving frame 14. That is, FIG. 10 shows (a) a front elevation, (b) a cross section along line b-b in (a), and (c) a cross section along line c-c in (a) of the fixed frame receiving portion 13a formed on the fixed frame 12. FIG. 11 shows the positional relationship between the fixed frame receiving portion 13a formed on the fixed frame 12, and the moving frame receiving portion 15a formed on the moving frame 14; (a) depicts the image blur compensation control operational center position, (b) the state of movement to the locking position, and (c) the locking position.

As described above, the actuator 10 causes the moving frame 14 to move translationally around the operational center position shown in FIG. 2 when image blur prevention control is being executed, thereby stabilizing the image. On the other hand, when image blur prevention control is not being executed, or the camera 1 is not in use, the moving frame 14 is moved to the locking position shown in FIG. 3. In the present embodiment, the locking position is set at a position to which the moving frame 14 is rotated clockwise around the optical axis of the image blur compensation lens 16 from the operational center position shown in FIG. 2.

The fixed frame receiving portions 13a, 13b, and 13c formed on the fixed frame 12 and the moving frame receiving portions 15a, 15b, and 15c formed on the moving frame 14 are concavities formed respectively on the fixed frame 12 and the moving frame 14; disposition of each steel ball 18 in these concavities, serves to prevent the dropping down of the steel balls 18 and, at the locking position, to position the steel balls 18.

Next we discuss the constitution of the fixed frame receiving portions 13a, 13b, and 13c and the moving frame receiving portions 15a, 15b, and 15c. As shown in FIG. 2, the fixed frame receiving portions 13a, 13b, and 13c are disposed on a circle D centered on the optical axis of the fixed frame 12, and are positioned between each of the drive coils at a mutual spacing of 120° each. Furthermore, each of the fixed frame receiving portions 13a, 13b, and 13c is respectively formed in the same shape.

At the same time, the moving frame receiving portions 15a, 15b, and 15c are formed at positions respectively corresponding to the fixed frame receiving portions 13a, 13b, and 13c on the moving frame 14. In other words, each of the moving frame receiving portions is disposed on a circle D centered on the optical axis, positioned between each of the drive magnets at a mutual spacing of 120°. Furthermore, each of the moving frame receiving portions 15a, 15b, and 15c is respectively formed in the same shape.

As shown in FIG. 10(a), the fixed frame receiving portion 13a has a fixed portion drop prevention wall 50 formed in an approximately arc shape, and a fixed portion contact wall 52 formed contiguously with the fixed portion drop prevention wall 50. Also, as shown in FIG. 10(c), the inner side of the fixed portion drop prevention wall 50 is formed to be flat, and the steel balls 18 can roll in any desired direction on the inner side of the fixed portion drop prevention wall 50. At the same time, the fixed portion contact wall 52 is formed continuously with the fixed portion drop prevention wall 50 so as to protrude in essentially the radial direction of a circle surrounded by the fixed portion drop prevention wall 50. The fixed portion contact wall 52 is constituted to taper toward the tip; that tip describes a curve having essentially the same curvature radius as the radius of the steel balls 18. Therefore the fixed portion drop prevention wall 50 and the fixed portion contact wall 52 as a whole are formed to describe approximately a teardrop shape. Moreover, the fixed portion contact wall 52 is directed to protrude in essentially the tangential direction of the circle D (FIG. 2) centered on the optical axis.

The steel ball 18 within the fixed frame receiving portion 13a rolls inside the fixed portion drop prevention wall 50 and does not contact the fixed portion drop prevention wall 50 during image blur prevention control. On the other hand, the steel ball 18 does contact the fixed portion contact wall 52 at the locking position, but because the tip of the fixed portion contact wall 52 is formed with essentially the same curvature radius as the steel balls 18, the ball makes contact with the fixed portion contact wall 52 in an area having a certain breadth.

Meanwhile, the moving frame receiving portion 15a formed on the moving frame 14 in correspondence to the fixed frame receiving portion 13a has essentially the same shape as the fixed frame receiving portion 13a, and is furnished with a movable portion drop prevention wall 54 and a movable portion contact wall 56 (FIG. 11). Also, as shown in FIG. 2, the moving frame receiving portion 15a movable portion contact wall 56 also protrudes in essentially the tangential direction of the circle D, but protrudes in the opposite direction to the fixed frame receiving portion 13a fixed portion contact wall 52.

Note that while we have here explained the constitution of the fixed frame receiving portion 13a and the moving frame receiving portion 15a, the fixed frame receiving portions 13b and 13c and the moving frame receiving portions 15b and 15c are constituted in exactly the same way, as shown in FIGS. 2 and 3.

Next, referring to FIG. 11, we discuss the relative positions of the fixed frame receiving portion 13a and the moving frame receiving portion 15a, and the position at which the steel ball 18 rolls.

First, as shown in FIG. 11(a), the fixed portion drop prevention wall 50 of fixed frame receiving portion 13a and the movable portion drop prevention wall 54 of moving frame receiving portion 15a are in essentially a superimposed state at the image blur compensation control operational center position. In this state, the steel balls 18 are positioned near the center of the fixed portion drop prevention wall 50 and the movable portion drop prevention wall 54. During the image blur compensation control operation, the relative movement of the moving frame 14 with respect to the fixed frame 12 results in the steel balls 18 being moved within the fixed portion drop prevention wall 50 and the movable portion drop prevention wall 54. For example, in FIG. 11(a), when the moving frame 14 has been moved to the upper position relative to the fixed frame 12, the moving frame receiving portion 15a is moved to the position shown by the dotted line in the figure; at this point the steel balls 18 are also moved to the position shown by the dotted line.

Next, when moving the frame 14 to the locking position, the moving frame 14 is moved in a clockwise direction (toward the right in the diagram) from the image blur compensation control operational center position shown in FIG. 11(a). This results, as shown in FIG. 11(b), in a narrowing of the overlapping portion between the fixed frame receiving portion 13a and the moving frame receiving portion 15a, such that the steel balls 18 approach the fixed portion contact wall 52 and the movable portion contact wall 56.

Next, as shown in FIG. 11(c), when the moving frame 14 is moved to the locking position, the overlapping portion between the fixed frame receiving portion 13a and the moving frame receiving portion 15a is minimized, and the steel balls 18 contact the fixed frame receiving portion 13a and the moving frame receiving portion 15a. In this state, that is, the steel balls 18 respectively contact the fixed portion contact wall 52 and the moving frame receiving portion 15a in an area having a certain breadth, therefore the steel balls 18 are uniquely positioned. Also, in this state movement of the moving frame receiving portion 15a in the direction tangential to the circle D relative to the fixed frame receiving portion 13a (the vertical direction as seen in FIG. 11) is impeded by the steel balls 18, and only movement of the moving frame receiving portion 15a in the circular direction (the horizontal direction as seen in FIG. 11) is permitted.

Here, as shown in FIG. 3, when the moving frame 14 has been moved to the locking position, the fixed frame receiving portions 13b and 13c and the moving frame receiving portions 15b and 15c are all moved to similar relative positions as seen in FIG. 11(c). Therefore in the three sets of fixed frame receiving portions and moving frame receiving portions, movement of the moving frame receiving portion relative to the fixed frame receiving portion is blocked in the circle D radial direction by the steel balls 18, and only movement in the circular direction is permitted. This results in restriction of translational movement by the moving frame 14 in the locking position, such that only rotation around the optical axis of the image blur compensation lens 16 is permitted. In this locking position, the optical axis of the image blur compensation lens 16 attached to the moving frame 14 matches the optical axis of other imaging lenses 8.

Next we discuss the mode of action for moving the moving frame 14 to the locking position.

First, when the power switch (not shown) to the camera 1 hand vibration function is turned off, the actuator 10 provided on the lens unit 2 is activated. The gyros 34a and 34b attached to the lens unit 2 detect vibration in a predetermined frequency band from moment to moment, outputting that value to computing circuits 38a and 38b built into the controller. The gyro 34a outputs a yawing direction angular velocity signal for the lens unit 2 to the computing circuit 38a; the gyro 34b outputs a pitching direction angular velocity for the lens unit 2 to the computing circuit 38*b*. The computing circuit 38*a* performs a time integration of the input angular velocity signal, calculates a yawing angle, and adds a predetermined optical characteristic correction to generate the horizontal lens position command signal Dx. Similarly, the computing circuit 38*b* performs a time integration of the input angular velocity signal, calculates a pitching angle, and adds a predetermined optical characteristic correction to generate the horizontal lens position command signal Dy. By moving the image blur compensation lens 16 from moment to moment to a position specified by the lens position command signal output in a time sequence by the computing circuits 38*a* and 38*b*, the image focused on the film surface F in the camera main unit 4 is stabilized.

This causes the fixed frame receiving portions 13*a*, 13*b*, and 13*c* and the moving frame receiving portions 15*a*, 15*b*, and 15*c* to move from the state shown in FIG. 11(*a*) to the state shown in FIG. 11(*b*). Also, the controller 36 sends a signal to a solenoid (not shown) linked to the locking hook 17 (FIG. 2), thereby energizing the solenoid and causing the locking hook 17 to rotate to the position shown by the imaginary line.

When the moving frame 14 is further rotated in the clockwise direction and each steel ball 18 approaches the fixed portion contact wall 52 and the movable portion contact wall 56, the controller 36 sends a signal to the second selector switch 46 (FIG. 8), changing the second selector switch 46 to the position at which a signal from the locking direction biasing means 47 is input to each of the drive circuits 44*a*, 44*b*, and 44*c*. By this means, the outputs of the magnetic sensor amps 42*a*, 42*b*, and 42*c* are isolated from the inputs to the drive circuit 44*a*, and the same current flows to the drive coils 20*a*, 20*b*, and 20*c* regardless of the detection signals on each of the Hall elements 24*a*, 22*b*, and 22*c*. As explained in Equation 2, sourcing the same current to each of the drive coils 20*a*, 20*b*, and 20*c* corresponds to driving the moving frame 14 in the rotary direction only. Therefore after the second selector switch 46 has been switched, the moving frame 14 is driven in the rotary direction only, and thereby controlled.

When the moving frame 14 is then further rotated clockwise and reaches the position shown in FIG. 3, the steel balls 18 sandwiched between the fixed frame receiving portions 13*a*, 13*b*, and 13*c* and the moving frame receiving portions 15*a*, 15*b*, and 15*c* respectively contact the fixed portion contact wall 52 and the movable portion contact wall 56.

When the moving frame 14 reaches the position shown in FIG. 3, the controller 36 sends a signal to the solenoid (not shown) and stops energizing it, so that the locking hook 17 is rotated to the position shown by the solid line in FIG. 3. As a result, the locking hook 17 attached to the fixed frame 12 engages with the locking protuberance 17*a* provided on the moving frame 14. Here, in the state depicted in FIG. 3, movement of the moving frame 14 with respect to the fixed frame 12 is restricted to rotation only by the fixed portion contact wall 52 and the movable portion contact wall 56, and by the action of the steel balls 18 sandwiched therebetween. In this state, the engaging of the locking hook 17 and the locking protuberance 17*a* results in restricted rotation by the moving frame 14, such that translational and rotational movement of the moving frame 14 is locked.

Finally, the controller 36 stops the energizing of each of the drive coils 20*a*, 20*b*, and 20*c*. The moving frame 14 is locked in a state whereby energizing of the solenoid (not shown) is stopped, therefore the moving frame 14 can be maintained in the locking position without consuming power.

Furthermore, because in the locked state each steel ball 18 is respectively sandwiched between the fixed portion contact wall 52 and the movable portion contact wall 56, each steel ball 18 is locked inside the fixed frame receiving portion and the moving frame receiving portion, and there is no looseness. The position of the steel balls 18 in the locking position is restricted to being inside an area surrounded by the fixed portion contact wall 52 and the movable portion contact wall 56, and is thus essentially uniquely determined.

Next, when the moving frame 14 is restored from the locking position to the operational center position, the controller 36 sends a signal to the solenoid (not shown) and energizes it, thereby rotating the locking hook 17 to the position shown by imaginary lines in FIG. 3. This results in a release of the engagement between the locking hook 17 and the locking protuberance 17*a*. Next, the locking position movement means 37 outputs a lens position command signal causing the moving frame 14 to rotate by a predetermined angle in the counterclockwise direction, such that the moving frame 14 is restored to the image blur compensation control operational center position shown in FIG. 2. The controller 36 then further sends a signal to the solenoid (not shown) and stops energizing it, causing the locking hook 17 to rotate to the position shown by the solid line in FIG. 2.

Here, in the locking position, the position of each steel ball 18 is essentially uniquely determined. By rotating the moving frame 14 from the locking position counterclockwise by a predetermined angle, the position to which each steel ball 18 is moved by rolling is also essentially uniquely determined. The position of the steel balls 18 within the fixed portion drop prevention wall 50 and the movable portion drop prevention wall 54 when the actuator 10 is restored to the operational center position can therefore be set at an appropriate position.

Using the camera of the first embodiment of the present invention, a moving frame to which an image blur compensation lens is attached can be rotated to move it to a locking position, thereby determining the position of each steel ball so that a formed image can be prevented from significantly blurring when steel balls are positioned.

Additionally, using the camera of the present embodiment, the steel balls are positioned together with the operation of moving the moving frame to a locking position when stopping the image blur compensation control or turning off the power supply, etc., therefore the steel balls can be positioned without executing any particular operation, and the position of the steel balls when the moving frame is restored to a predetermined image blur compensation control operational center position can be maintained appropriately.

Additionally, using the camera of the present embodiment, each steel ball is positioned at essentially the center of a surface surrounded by a fixed portion drop prevention wall and a movable portion drop prevention wall, therefore the surface surrounded by the fixed portion drop prevention wall and the movable portion drop prevention wall can be constituted as a narrow surface while preventing contact by each of the steel balls with each of the drop prevention walls. This permits the size of the actuator to be reduced.

With the camera of the present embodiment, when locked, the steel balls make contact in a predetermined area with the fixed portion contact wall and the movable portion contact wall, therefore the steel balls can be reliably positioned.

Furthermore, with the camera of the present embodiment the fixed portion contact wall and the movable portion contact wall protrude in directions essentially tangential to a circle centered on the optical axis and in directions opposite to one another, therefore by rotating the moving frame in a predetermined direction around the optical axis, the gap between the fixed portion contact wall and the movable portion contact wall can be narrowed, and the steel balls brought into contact with each of the contact walls.

Also, using the camera of the present embodiment, the fixed portion drop prevention wall and the fixed portion contact wall, and the movable portion drop prevention wall and the movable portion contact wall, are respectively formed in approximately a teardrop shape, such that the steel balls can be smoothly moved to a position at which they contact the fixed portion contact wall and the movable portion contact wall.

Furthermore, using the camera of the present embodiment, the locking hook locks the rotation of the moving frame with respect to the fixed frame, thus enabling the moving frame to be maintained in a state whereby translational movement thereof is locked.

Also, in the camera of the present embodiment of the present invention, when the moving frame is moved to the locking position, the moving frame can be driven by switching the second selector switch and applying the locking direction biasing means. The moving frame is thus biased so as to be rotated in the locking direction by the output of the locking direction biasing means, regardless of position command signals output from the Hall elements. As a result, drive force is generated in the direction in which movement of the moving frame is restricted; excessive flow of current to the drive coil can be prevented, and the moving frame can be biased in the locking direction by an appropriate current.

In the embodiment described above, the fixed portion drop prevention wall, fixed portion contact wall, movable portion drop prevention wall, and movable portion contact wall were formed by forming concavities in the fixed frame or the moving frame, but these walls can also be formed by protrusions from the fixed frame or the moving frame.

Furthermore, the embodiment described above was constituted such that each of the steel balls made contact with the fixed portion contact wall and the moving portion contact wall in an area having a certain breadth, but the steel balls could also make contact with the contact walls at two or more points. Also, it is not necessary for each of the steel balls to make contact with both the fixed portion contact wall and the moving portion contact wall in an area having a certain breadth or with two or more points; it is also acceptable for the balls to make contact with either the fixed portion contact wall or the moving portion contact wall at a single point.

In the embodiment described above, each steel ball makes contact simultaneously with both the fixed portion contact wall and the moving portion contact wall, but it is not required that each steel ball necessarily make contact simultaneously with both contact walls; it is sufficient for the steel balls to be disposed with a sufficiently small gap between each of the contact walls.

Next, referring to FIGS. 12 through 17, we discuss a camera according to a second embodiment of the present invention. The camera of the present embodiment differs from that of the first embodiment described above with respect to its mechanism for locking the built-in actuator moving frame, and the action thereof. Therefore we will here discuss only those portions which differ from the first embodiment, and will omit a discussion of similar parts.

Figure 12:
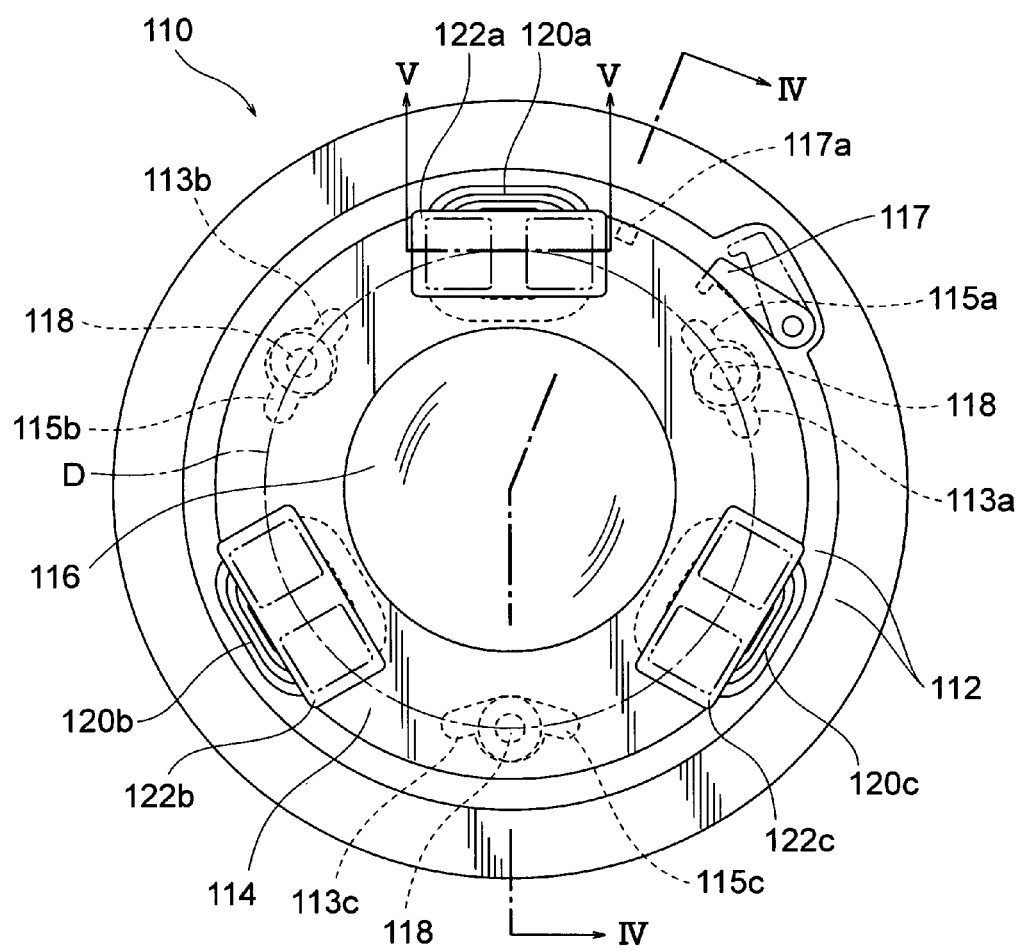
FIG. 12
A front elevation of an actuator in a second embodiment of the present invention, whereby the moving frame is in the image blur compensation control operational center position.
Figure 13:
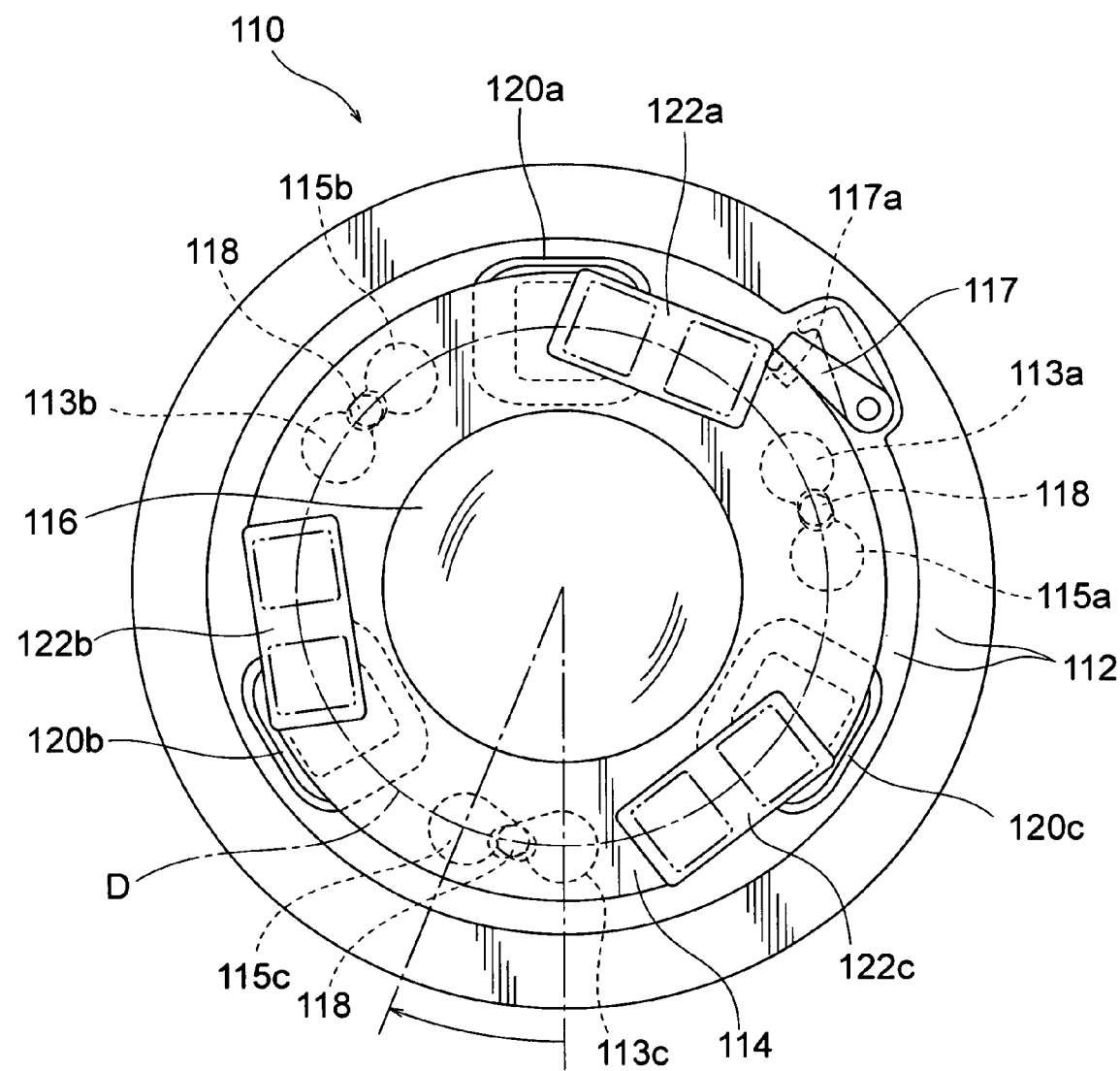
FIG. 13
A front elevation of an actuator in a second embodiment of the present invention, whereby the moving frame is in the locking position.
Figure 14:
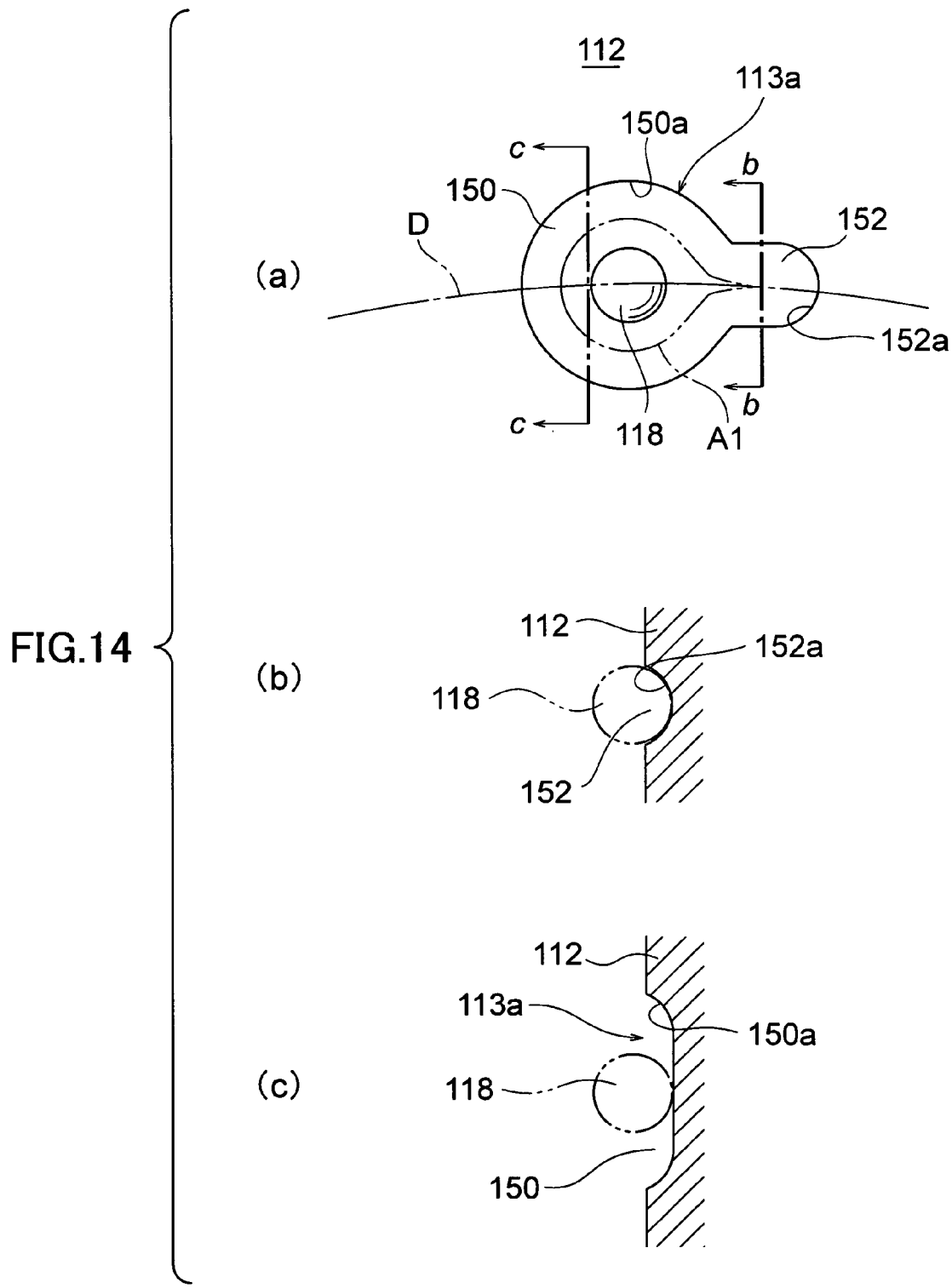
FIG. 14
A front elevation, (b) a cross section along line b-b in (a), and (c) a cross section along line c-c in (a) of a fixed frame receiving portion formed on a fixed frame.
Figure 15:
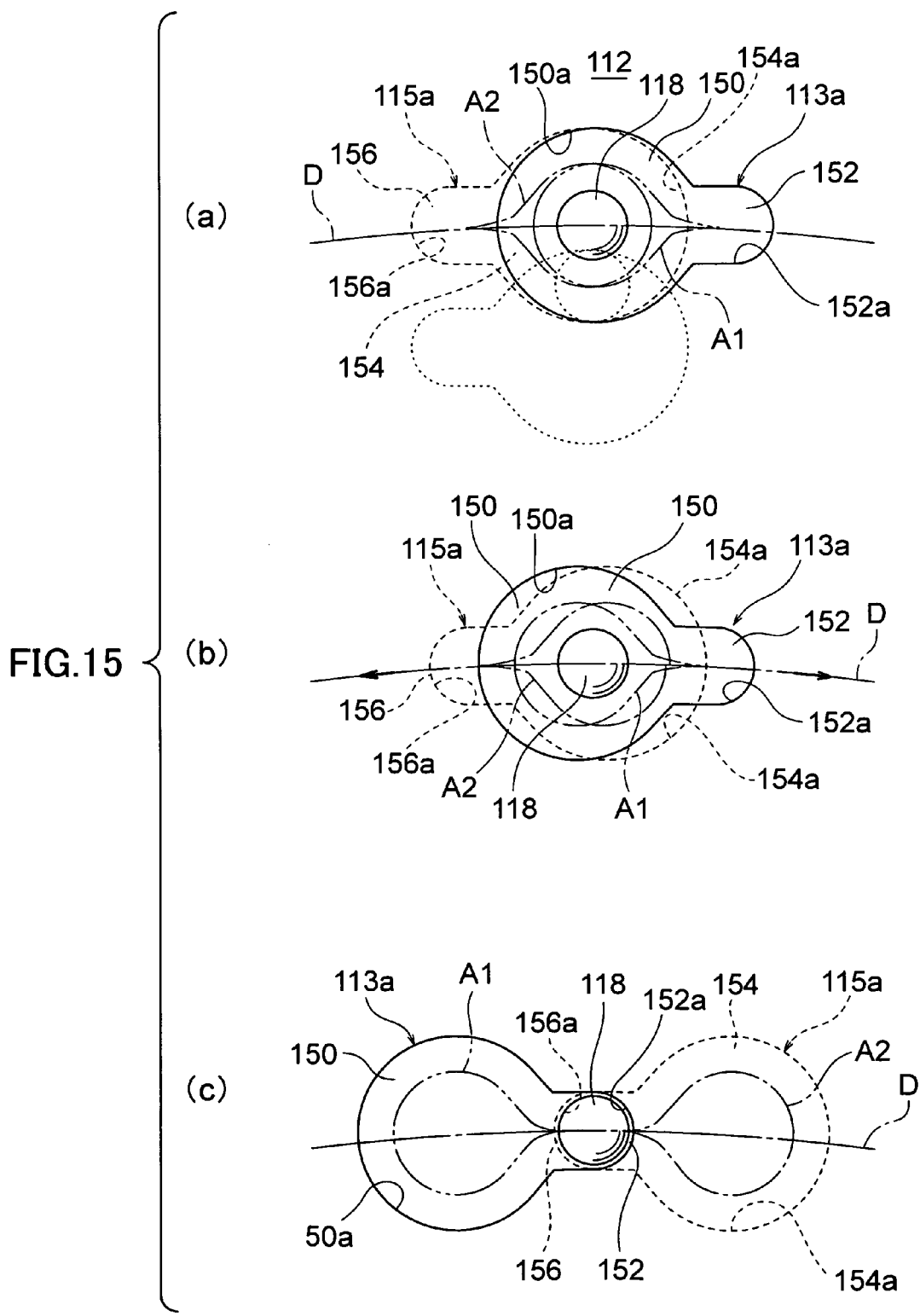
FIG. 15
A diagram showing the positional relationship between a fixed frame receiving portion formed on a fixed frame, and a moving frame receiving portion formed on a moving frame; (a) depicts the image blur compensation control operational center position, (b) the state of movement to the locking position, and (c) the locking position.
Figure 16:
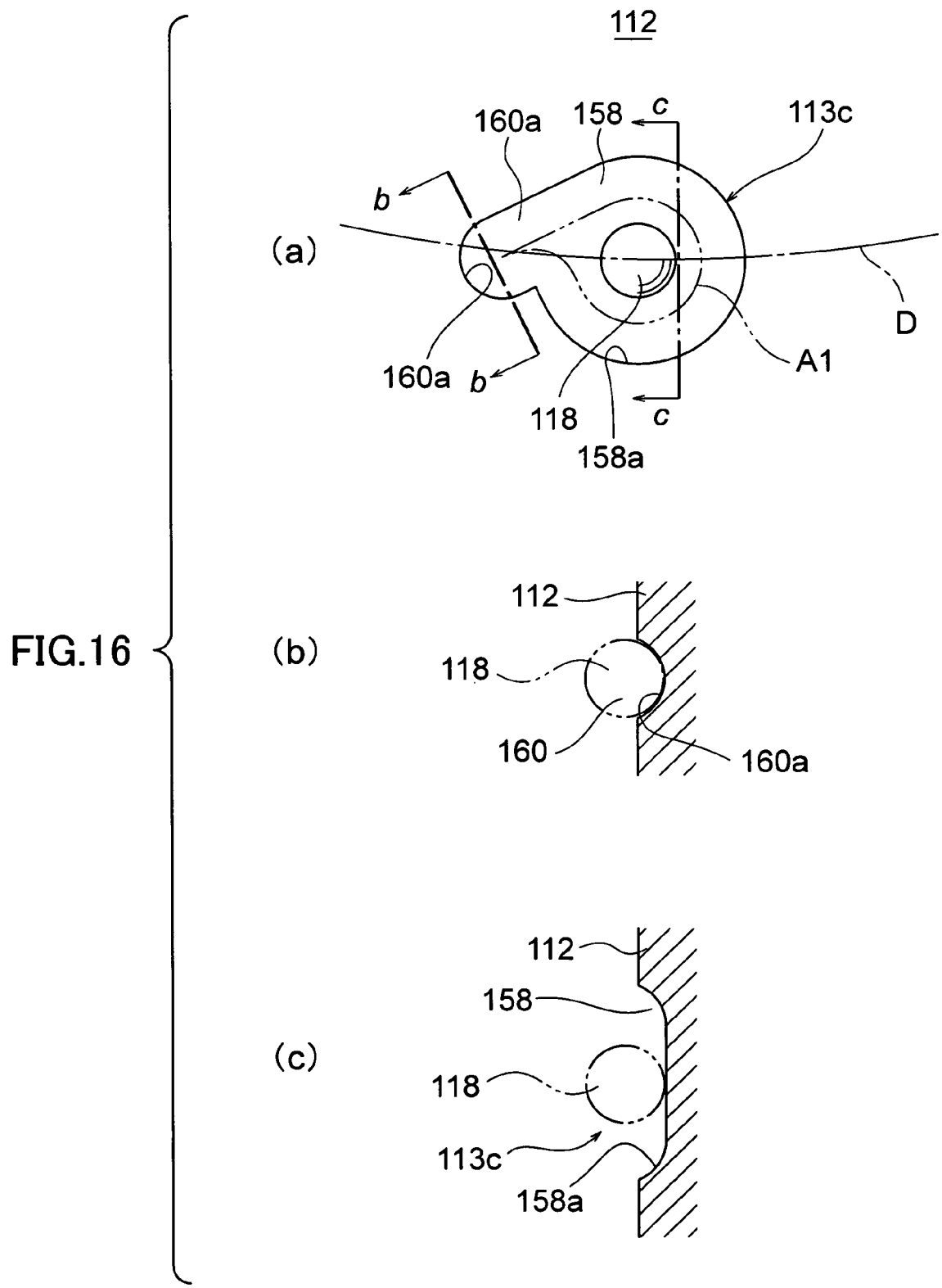
FIG. 16
A diagram showing (a) a front elevation, (b) a cross section along line b-b in (a), and (c) a cross section along line c-c in (a) of a fixed frame receiving portion.
Figure 17:
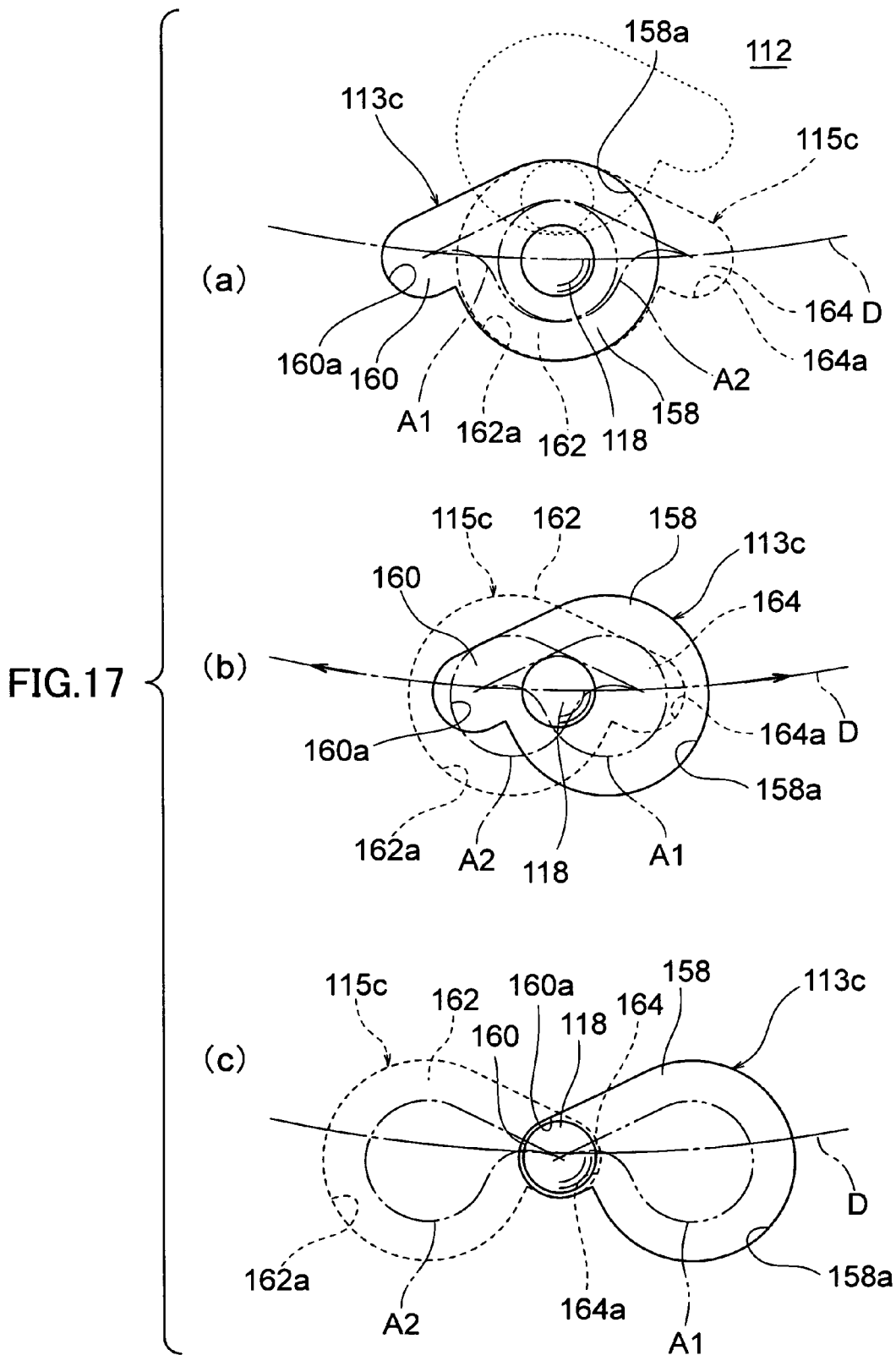
FIG. 17
A diagram showing the positional relationship between a fixed frame receiving portion and a moving frame receiving portion; (a) depicts the image blur compensation control operational center position, (b) the state of movement to the locking position, and (c) the locking position.

FIG. 12 is a front elevation of an actuator 110 built into a camera according to the second embodiment of the present invention; shown here is the state in which a moving frame is in the image blur compensation control operational center position. FIG. 13 is a front elevation of the actuator 110 with a moving frame 114 in the locking position. FIGS. 14 through 17 depict an expanded view of a fixed frame receiving portion and a moving frame receiving portion respectively formed on the fixed frame 112 and the moving frame 114. That is, FIG. 14 shows (a) a front elevation, (b) a cross section along line b-b in (a), and (c) a cross section along line c-c in (a) of a fixed frame receiving portion 113a formed on the fixed frame 112. FIG. 15 shows the positional relationship between the fixed frame receiving portion 113a formed on the fixed frame 112, and the moving frame receiving portion 115a formed on the moving frame 114; (a) depicts the image blur compensation control operational center position, (b) the state of movement to the locking position, and (c) the locking position. Additionally, FIG. 16 shows (a) a front elevation, (b) a cross section along line b-b in (a), and (c) a cross section along line c-c in (a) of a fixed frame receiving portion 113c. FIG. 17 shows the positional relationship between the fixed frame receiving portion 113c and the moving frame receiving portion 115c; (a) depicts the image blur compensation control operational center position, (b) the state of movement to the locking position, and (c) the locking position.

As described above, the actuator 110 translationally moves the moving frame 114 around the operational center position shown in FIG. 12 when under image blur compensation control, thereby stabilizing an image. When image blur compensation control is not executed or the camera is not in use, on the other hand, the moving frame 114 is moved to the locking position shown in FIG. 13. In the present embodiment the locking position is set at a position whereby the moving frame 114 is caused to rotate from the operational center position shown in FIG. 12 clockwise around the optical axis of an image blur compensation lens 116.

The fixed frame receiving portions 113a, 113b, and 113c formed on the fixed frame 112 and the moving frame receiving portions 115a, 115b, and 115c formed on the moving frame 114 are concavities respectively formed on the fixed frame 112 and the moving frame 114; disposition of each of steel ball 118 in these concavities serves to prevent dropping down of the steel balls 118 and, at the locking position, to lock the moving frame 114.

Next we discuss the constitution of the fixed frame receiving portions 113a, 113b, and 113c and the moving frame receiving portions 115a, 115b, and 115c. As shown in FIG. 12, the fixed frame receiving portions 113a, 113b, and 113c are disposed on a circle D centered on the optical axis of the fixed frame 112, and are positioned between each of the drive coils at a mutual spacing of 120° each. Furthermore, each of the fixed frame receiving portions 113a, 113b, and 113c disposed on both sides of a drive coil 120 is respectively formed in the same shape, and the fixed frame receiving portion 113c disposed between the drive coils 120b and 120c differs in shape from the fixed frame receiving portion 113a and fixed frame receiving portion 113b.

At the same time, the moving frame receiving portions 115a, 115b, and 115c are formed at positions respectively corresponding to the fixed frame receiving portions 113a, 113b, and 113c on the moving frame 114. In other words, each of the moving frame receiving portions is disposed on a circle D centered on the optical axis, positioned between each of the drive magnets at a mutual spacing of 120°. Furthermore, each of the fixed frame receiving portions moving frame receiving portions 115a, 115b, and 115c is respectively formed in the same shape, and the moving frame receiving portion 115c disposed between drive magnets 122b and 122c differs in shape from the moving frame receiving portions 115a and 115b.

As shown in FIG. 14(a), the fixed frame receiving portion 113a has a rolling area 150 shaped as approximately a circular depression, and a positionally restricted area 152 formed connecting to this rolling area 150. The rim of the rolling area 150 is demarcated by a fixed portion rolling area demarcation wall 150a. As shown in FIG. 14(*c*), the rolling area 150 is a relatively broad area, the bottom surface of which is to be formed flat; in this area the steel ball 118 can roll in any desired direction. At the same time, the positionally restricted area 152 is formed to connect from the rolling area 150, and is constituted to protrude in an essentially radial direction from the approximately circular rolling area 150. The positionally restricted area 152 is a narrow width area, extending in a direction essentially tangential to a circle D (FIG. 112) centered on the optical axis. The rim of the positionally restricted area 152 is demarcated by a fixed portion restricted area demarcation wall 152a. As shown in FIG. 14(*b*), the positionally restricted area 152 is formed such that its bottom surface is arc-shaped in section; the curvature radius of this arc is formed to be essentially the same as the radius of the steel ball 118.

The center point of the steel ball 118 disposed within the fixed frame receiving portion 113a can move in the area surrounded by the double dot and dash line A1 in FIG. 14(*a*), as well as on the double dot and dash line A1 itself. That is, when the center of the steel ball 118 moves on the double dot and dash line A1 in the rolling area 150, the surfaces of the steel ball 118 contact the fixed portion rolling area demarcation wall 150a, and they become unable to move any further outward. At the same time, in the positionally restricted area 152, the narrow fixed portion restricted area demarcation wall 152a gap causes the steel ball 118 to simultaneously contact the fixed portion restricted area demarcation wall 152a. Therefore in the positionally restricted area 152, the steel ball 118 can move only in the circle D direction in which the positionally restricted area 152 extends; movement of the steel ball 118 is restricted in the direction perpendicular to the circle D. That is, the area in which the center of the steel ball 118 can move in the positionally restricted area 152 is line-shaped; this line-shaped area essentially matches the circle D (FIG. 12) on which the fixed frame receiving portion 113a is disposed.

In the meantime, the moving frame receiving portion 115a formed on the moving frame 114 in correspondence to the fixed frame receiving portion 113a has essentially the same shape as the fixed frame receiving portion 113a, and is furnished with a rolling area 154 and a positionally restricted area 156 (FIG. 15). Moreover, the rim of the rolling area 154 is demarcated by a moving portion rolling area demarcation wall 154a, and the rim of the positionally restricted area 156 is demarcated by a moving portion restricted area demarcation wall 156a. As shown in FIG. 12, the positionally restricted area 156 of moving frame receiving portion 115a also extends in a direction essentially tangential to the circle D, but extends in a direction opposite that of the positionally restricted area 152 of fixed frame receiving portion 113a.

Note that while we have here explained the constitution of the fixed frame receiving portion 113a and the moving frame receiving portion 115a, the fixed frame receiving portion 113b and the moving frame receiving portion are constituted in exactly the same way, as shown in FIGS. 12 and 13. In the present embodiment the positionally restricted area is formed in a straight line so as to extend in a direction essentially tangential to the circle D, but in cases where the positionally restricted area is long, the positionally restricted area can also be constituted in an arc shape extending along the circle D. In the present Specification, the words "extending in a direction essentially tangential to a circle" shall be deemed to include both the form of a straight line extending in an essentially tangential direction, and the form of an essentially arc shape extending along a circle.

Next, referring to FIG. 15, we discuss the relative positions of the fixed frame receiving portion 113a and the moving frame receiving portion 115a, as well as the area in which the steel ball 118 can roll.

First, as shown in FIG. 15(*a*), in the image blur compensation control operational center position, the rolling area 150 of fixed frame receiving portion 113a and the rolling area 154 of moving frame receiving portion 115a are in essentially a superimposed state. In this state, the center of the steel ball 118 can move in the overlapping portion between the area demarcated by the fixed portion rolling area demarcation wall 150a of rolling area 150 surrounded by double dot and dash line A1, and the area demarcated by the rolling area 154 and surrounded by single dot and dash line A2. During the image blur compensation control operation, the center of the steel ball 118 moves within the portion overlapping between the double dot and dash line A1 and the single dot and dash line A2 as a result of the relative movement of the moving frame 114 with respect to the fixed frame 112. In FIG. 15(*a*), for example, when the moving frame 114 is moved to the lowermost position relative to the fixed frame 112, the moving frame receiving portion 115a is moved to the position shown by a dotted line in the figure, at which point the steel ball 118 is also moved to the position shown by the dotted line.

Next, when the moving frame 114 is moved to the locking position, the moving frame 114 is moved clockwise (to the right in FIG. 15) from the image blur compensation control operational center position. This causes the portion overlapping between the double dot and dash line A1 in the fixed frame receiving portion 113a and the single dot and dash line A2 in the moving frame receiving portion 115a to narrow as shown in FIG. 15(*b*), such that the area within which the steel ball 118 can move gradually narrows.

Next, as shown in FIG. 15(*c*), when the moving frame 114 is moved to the locking position, the portion overlapping between the double dot and dash line A1 and the single dot and dash line A2 becomes a line-shaped area. In this state, that is, the steel ball 118 is positioned at the fixed frame receiving portion 113a positionally restricted area 152 and is simultaneously positioned at the moving frame receiving portion 115a positionally restricted area 156. For this reason movement of the moving frame receiving portion 115a in the radial direction of circle D (the vertical direction as seen in FIG. 15) relative to the fixed frame receiving portion 113a is blocked by the steel ball 118, and only movement of the moving frame receiving portion 115a in the circular direction (the horizontal direction as seen in FIG. 15) is permitted.

Here, as shown in FIG. 13, when the moving frame 114 is moved to the locking position, the fixed frame receiving portion 113b and the moving frame receiving portion 115b are both moved to a similar relative position as that shown in FIG. 15(*c*). Therefore movement by the moving frame receiving portion 115b in the circle D radial direction relative to the fixed frame receiving portion 113b is blocked by the steel ball 118, and only circular direction movement of the moving frame receiving portion 115b is allowed. For the moving frame 114, that is, movement in the circle D radial direction is restricted by two points on the moving frame receiving portions 115a and 115b. This results in restricted translational movement of the moving frame 114 in the locking position, such that only rotation centered on the optical axis of the image blur compensation lens 116 is allowed. In the locking position, the optical axis of the image blur compensation lens 116 attached to the moving frame 114 coincides with the optical axis of the other imaging lenses 8.

Next, referring to FIG. 16, we discuss the constitution of the fixed frame receiving portion 113c.

As shown in FIG. 16(a), the fixed frame receiving portion 113c has a rolling area 158 shaped as approximately a circular depression, and a fixed portion adjustment area 160 formed continuously with this rolling area 158. The rim of the rolling area 158 is demarcated by a fixed portion rolling area demarcation wall 158a. As shown in FIG. 16(c), the rolling area 158 is a relatively broad area, the bottom surface of which is to be formed flat; in this area the steel ball 118 can roll in any desired direction. At the same time, a fixed portion adjustment area 160 is formed to connect from the rolling area 158 as a narrow width area extending in the circular tangent direction. The fixed portion adjustment area 160 inclines outward relative to the tangential direction of a circle D (FIG. 12) centered on the optical axis, and extends so as to intersect the circle D. The rim of the fixed portion adjustment area 160 is demarcated by the fixed portion adjustment area demarcation wall 160a. As shown in FIG. 16(b), the fixed portion adjustment area 160 is formed such that its bottom surface is arc-shaped in section, and the curvature radius of this arc is formed to be essentially the same as the radius of the steel ball 118.

The center point of the steel ball 118 disposed within the fixed frame receiving portion 113c can move in an area surrounded by the double dot and dash line A1 in FIG. 16(a), and on the double dot and dash line A1 itself. That is, in the rolling area 158, when the center of the steel ball 118 rolls up to the double dot and dash line A1, the surface of the steel ball 118 contacts the fixed portion rolling area demarcation wall 158a, and cannot move any further out. At the same time, in the fixed portion adjustment area 160, the fixed portion adjustment area demarcation wall 160a gap is narrow, therefore the steel ball 118 simultaneously contacts the fixed portion adjustment area demarcation wall 160a on both sides. Hence in the fixed portion adjustment area 160, the steel ball 118 can move only in the direction in which the fixed portion adjustment area 160 extends, and movement of the steel ball 118 in the direction perpendicular thereto is restricted. That is, the area in which the center of the steel ball 118 can move in the fixed portion adjustment area 160 is line-shaped, and this line-shaped area intersects the circle D (FIG. 12) on which the fixed frame receiving portion 113c is disposed.

At the same time, a moving frame receiving portion 115c, corresponding to a fixed frame receiving portion 113c and formed on the moving frame 114, is formed to have essentially the same shape as the fixed frame receiving portion 113c, and is furnished with a rolling area 162 and a moving portion adjustment area 164 (FIG. 17). Furthermore, the rim of the rolling area 162 is demarcated by a moving portion rolling area demarcation wall 162a, and the rim of the moving portion adjustment area 164 is demarcated by a moving portion adjustment area demarcation wall 164a. Further, as shown in FIG. 12, the moving frame receiving portion 115c moving portion adjustment area 164 extends in a direction intersecting the circle D, but extends in the opposite direction to that of the fixed frame receiving portion 113c fixed portion adjustment area 160.

Next, referring to FIG. 17, we discuss the relative positions of the fixed frame receiving portion 113c and the moving frame receiving portion 115c, as well as the area in which the steel ball 118 can roll.

First, as shown in FIG. 17(a), at the image blur compensation control operational center position the rolling area 158 of fixed frame receiving portion 113c and the rolling area 162 of moving frame receiving portion 115c are in an essentially superimposed state. In this state, the center of the steel ball 118 can move in the overlapping portion between the area demarcated by the fixed portion rolling area demarcation wall 158a of rolling area 158 surrounded by the double dot and dash line A1 and the area demarcated by rolling area 162 and surrounded by the single dot and dash line A2. During the image blur compensation control operation, the center of the steel ball 118 moves within the portion overlapping between the double dot and dash line A1 and the single dot and dash line A2 as a result of the relative movement of the moving frame 114 relative to the fixed frame 112. In FIG. 17(a), for example, when the moving frame 114 is moved to the uppermost position relative to the fixed frame 112, the moving frame receiving portion 115c is moved to the position shown by the dotted line in the figure, at which point the steel ball 118 is also moved to the position shown by the dotted line.

Next, when the moving frame 114 is moved to the locking position, the moving frame 114 is moved clockwise (to the left in FIG. 17) from the image blur compensation control operational center position. This causes the portion overlapping between the double dot and dash line A1 in the fixed frame receiving portion 113c and the single dot and dash line A2 in the moving frame receiving portion 115c to narrow as shown in FIG. 17(b), such that the area in which the steel ball 118 can move gradually narrows.

Next, as shown in FIG. 17(c), when the moving frame 114 is moved to the locking position, the overlapping portion between the double dot and dash line A1 and the single dot and dash line A2 is the point of intersection thereof. That is, in this state the steel ball 118 is positioned at the fixed portion adjustment area 160 of fixed frame receiving portion 113c, and at the same time is positioned at the moving portion adjustment area 164 of moving frame receiving portion 115c. Therefore the position of the center of the steel ball 118 is limited to the intersection between the double dot and dash line A1 in the fixed portion adjustment area 160 and the single dot and dash line A2 in the moving portion adjustment area 164. The position of the intersection between the double dot and dash line A1 and the single dot and dash line A2 changes according to the rotational position of the moving frame 114 relative to the fixed frame 12.

As described above, in the locking position the moving frame 114 is restricted by the action of the fixed frame receiving portions 113a and 113b and the moving frame receiving portions 115a and 115b, such that the optical axis of the image blur compensation lens 116 and the optical axis of the other imaging lenses 8 coincide. In the locking position, that is, the moving frame 114 is placed in a state whereby only rotation centered on the optical axis is allowed by the fixed frame receiving portions 113a and 113b and the moving frame receiving portions 115a and 115b; the fixed frame receiving portion 113c and the moving frame receiving portion 115c allow this rotation by changing the position of the intersection between the double dot and dash line A1 and the single dot and dash line A2.

Also, since the double dot and dash line A1 in the fixed portion adjustment area 160 and the single dot and dash line A2 in the moving portion adjustment area 164 are oriented so as to intersect, there will always be a point of intersection between the double dot and dash line A1 and the single dot and dash line A2 even when a margin of error is included in the position and shape of the fixed frame receiving portion and the moving frame receiving portion. Therefore in the locking position it will not occur that no overlapping point between the fixed portion adjustment area 160 and the moving portion adjustment area 164 exists, or that the steel ball 118 cannot be simultaneously positioned within the fixed portion adjustment area 160 and the moving portion adjustment area 164.

On this point, if in the present embodiment the fixed frame receiving portion 113c and moving frame receiving portion 115c have the same shape as the fixed frame receiving portion 113a and the moving frame receiving portion 115a, and a position restricting area is provided, then in the locking position the distance from the optical axis to each steel ball 118 will be limited by three points. Therefore when a margin of error is included in the position and shape of the fixed frame receiving portion and the moving frame receiving portion, or when dimensional distortions arise due to thermal expansion, it becomes impossible to simultaneously sandwich each steel ball 118 within three sets of position restricting areas. In such cases, it may occur that the moving frame 114 floats up from the fixed frame 12 without any of the steel balls 118 being contained at the appropriate locations within positionally restricted areas, and the image blur compensation lens 116 locking position slips.

Next we discuss the action which moves the moving frame 114 to the locking position.

First, when the camera hand vibration function startup switch (not shown) is turned off, or when the camera power supply switch (not shown) is turned off, the locking position movement means 37 (FIG. 8) built into the controller 36 moves the moving frame 114 toward the locking position.

As a result, the fixed frame receiving portions 113a, 113b, and 113c, and the moving frame receiving portions 115a, 115b, and 115c shift from the state shown in FIGS. 15(a) and 17(a) to the state shown in FIGS. 15(b) and 17(b). The controller 36 sends a signal to the solenoid (not shown) connected to the locking hook 117 (FIG. 12), energizing it and thereby rotating the locking hook 117 to the position shown by the imaginary line.

When the moving frame 114 is rotated further clockwise and reaches the position shown in FIG. 13, the steel balls 118 sandwiched by the fixed frame receiving portions 113a and 113b and the moving frame receiving portions 115a and 115b become respectively sandwiched between the positionally restricted areas 152 and 156. In the meantime, the steel ball 118 sandwiched between fixed frame receiving portion 113c and the moving frame receiving portion 115c also becomes sandwiched between the fixed portion adjustment area 160 and the moving portion adjustment area 164.

When the moving frame 114 reaches the position shown in FIG. 13, the controller 36 sends a signal to the solenoid (not shown) and stops energizing it, so that the locking hook 117 is turned to the position shown by the solid line in FIG. 3. This results in engagement of the locking hook 117 attached to the fixed frame 112 with the locking protuberance 117a provided on the moving frame 114. Here, in the state shown in FIG. 13, movement of the moving frame 114 relative to the fixed frame 112 is restricted to rotation only by the action of the positionally restricted areas 152 and 156 and the steel ball 118 sandwiched therebetween. In this state, engaging of the locking hook 117 with the locking protuberance 117a results in restriction of the rotation of the moving frame 114 and locking of translational and rotational movement by the moving frame 114.

In the locking position, each steel ball 118 is respectively sandwiched between the positionally restricted areas 152 and 156, which are formed to have a curved surface with essentially the same curvature radius as that of the steel ball 118, and between the fixed portion adjustment area 160 and the moving portion adjustment area 164. Therefore since the contact surface area between each steel ball 118 and the fixed frame receiving portion and moving frame receiving portion becomes comparatively broad, the pressure acting on the fixed frame receiving portion and the moving frame receiving portion is reduced when a shock force acts on the camera.

Furthermore, because in the locking position each steel ball 118 is respectively sandwiched between the positionally restricted areas 152 and 156 and between the fixed portion adjustment area 160 and the moving portion adjustment area 164, each steel ball 118 is locked within the fixed frame receiving portion and the moving frame receiving portion, and there is no looseness. Also, the position of the steel ball 118 in the locking position is restricted within the positionally restricted area and the adjustment area, and is essentially uniquely positioned.

Next, when the moving frame 114 is restored from the locking position to the operational center position, the controller 36 sends a signal to the solenoid (not shown) and energizes it, thereby rotating the locking hook 117 to the position shown by imaginary lines in FIG. 13. This results in a release of the engagement between the locking hook 117 and the locking protuberance 117a. Next, the locking position movement means 37 outputs a lens position command signal causing the moving frame 114 to rotate by a predetermined angle in the counterclockwise direction, such that the moving frame 114 is restored to the image blur compensation control operational center position shown in FIG. 12. The controller 36 then further sends a signal to the solenoid (not shown) and stops energizing it, causing the locking hook 117 to rotate to the position shown by the solid line in FIG. 12.

Here, in the locking position, the position of each steel ball 118 is essentially uniquely determined. By rotating the moving frame 114 from the locking position counterclockwise by a predetermined angle, the position to which each steel ball 118 is moved by rolling is also essentially uniquely determined. The position of the steel balls 118 within the rolling area when the actuator 110 is restored to the operational center position can therefore be set at an appropriate position.

Using the camera of the second embodiment of the present invention, at the locking position the steel balls are sandwiched in two positionally restricted areas such that the movement of the moving frame is restricted by two points in the radial direction of a circle centered on the optical axis, and translational movement of the moving frame is locked. Without providing any special members, that is, translational movement of the moving frame can be locked simply by providing a positionally restricted area in the steel ball receiving portion. The moving frame can by this means be locked without increasing the outside diameter of the actuator.

Using the camera of the second embodiment of the present invention, a single ball is sandwiched between a fixed portion adjustment area and a movable portion adjustment area, therefore the distance between the steel ball sandwiched between these elements and the optical axis may be varied. As a result, positional and dimensional errors in the positionally restricted area can be allowed, while positioning of the steel balls sandwiched between the fixed portion adjustment area and the moving portion adjustment area is reliably performed.

Additionally, when using the camera of the second embodiment of the present invention, the positionally restricted area comprises a curved surface having essentially the same curvature radius as the surface of the steel balls, such that the contact surface area where the positionally restricted area contacts the steel balls can be made broad, and contact pressure reduced.

We have discussed above preferred embodiments of the present invention, but a number of variations can also be added to the embodiments described above. In particular, the present invention was applied to a film camera in the embodiments described above, but the present invention can also be applied to still image or moving image capture cameras of any desired type, such as digital cameras, video cameras, and the like.

In the embodiments described above, the moving frame was supported by three steel balls, but three or more steel balls could also be used.

Furthermore, in the embodiment described above, rotation of the moving frame was locked by the locking hook, but as a rotation locking means it would also be acceptable to provide a shaft extending from the fixed frame to the moving frame when locked, with a concavity or a hole to receive this shaft.

| Explanation of Reference Numerals | |
|---|---|
| 1 | Camera according to an embodiment of the present invention |
| 2 | Lens unit |
| 4 | Camera main unit |
| 6 | Lens barrel |
| 8 | Imaging lenses |
| 10 | Actuator |
| 12 | Fixed frame (fixed portion) |
| 13a, 13b, 13c | Fixed frame receiving portions |
| 14 | Moving frame (movable portion) |
| 15a, 15b, 15c | Moving frame receiving portions |
| 16 | Image blur compensation lens |
| 17 | Locking hook (rotation locking means) |
| 17a | Locking protuberance |
| 18 | Steel ball (spherical body) |
| 20a, 20b, 20c | Drive coils |
| 22a, 22b, 22c | Drive magnets |
| 24a, 24b, 24c | Hall elements |
| 26 | Drawing yoke |
| 28 | Back yoke |
| 34a, 34b | Gyros |
| 36 | Controller |
| 37 | Locking position movement means |
| 38a, 38b | Computation circuits |
| 40a, 40b, 40c | Computation circuits |
| 42a, 42b, 42c | Drive circuits |
| 45 | Selector switch |
| 46 | Second selector switch |
| 47 | Locking direction biasing means |
| 50 | Fixed portion drop prevention wall |
| 52 | Fixed portion contact wall |
| 54 | Movable portion drop prevention wall |
| 56 | Movable portion contact wall |
| 110 | Actuator |
| 112 | Fixed frame (fixed portion) |
| 113a, 113b, 113c | Fixed frame receiving portions |
| 114 | Moving frame (movable portion) |
| 115a, 15b, 15c | Moving fame receiving portion |
| 116 | Image blur compensation lens |
| 117 | Locking hook (rotation locking means) |
| 117a | Locking protrusion |
| 118 | Steel balls (spherical bodies) |
| 120a, 120b, 120c | Drive coils |
| 122a, 122b, 122c | Drive magnets |
| 150 | Rolling area |
| 150a | Fixed portion rolling area demarcation wall |
| 152 | Positionally restricted area |
| 152a | Fixed portion restricted area demarcation wall |
| 154 | Rolling area |
| 154a | Moving portion rolling area demarcation wall |
| 156 | Positionally restricted area |
| 156a | Moving portion restricted area demarcation wall |
| 158 | Rolling area |
| 158a | Fixed portion rolling area demarcation wall |
| 160 | Fixed portion adjustment area |
| 160a | Fixed portion adjustment area demarcation wall |
| 162 | Rolling area |

-continued

| Explanation of Reference Numerals | |
|---|---|
| 162a | Moving portion rolling area demarcation wall |
| 164 | Moving portion adjustment area |
| 164a | Moving portion adjustment area demarcation wall |

The invention claimed is:

1. An actuator for moving an imaging lens within a plane perpendicular to the optical axis thereof to prevent blurring of an image, comprising:

a fixed portion;

a movable portion attached to the imaging lens;

a plurality of spherical bodies sandwiched between the movable portion and the fixed portion, supporting the movable portion such that it can be moved;

a drive means for driving the movable portion with respect to the fixed portion, causing the movable portion to move rotationally and translationally;

fixed portion drop prevention walls provided on the fixed portion so as to surround each of the spherical bodies and prevent the spherical bodies from dropping;

fixed portion contact walls formed contiguously with these fixed portion drop prevention walls such that when the movable portion is moved to a predetermined locking position, the spherical bodies make contact therewith;

movable portion drop prevention walls provided on the movable portion so as to surround each of the spherical bodies and prevent the spherical bodies from dropping;

movable portion contact walls formed contiguously with the movable portion drop prevention walls such that the spherical bodies contact therewith when the movable portion is moved to the locking position; and a control means for controlling the drive means, moving the movable portion to the locking position by rotating the movable portion around the optical axis, thereby positioning each of the spherical bodies and restoring the movable portion to a predetermined image blur prevention control operational center position by rotating the movable portion by a predetermined angle from the locking position.

2. The actuator according to claim 1, wherein the image blur prevention control operational center position is set such that the spherical bodies are positioned at essentially the center of a surface respectively surrounded by the fixed portion drop prevention walls and the movable portion drop prevention walls.

3. The actuator according to claim 1, wherein at least either the fixed portion contact walls or the movable portion contact walls are constituted such that the tip thereof tapers, and at least two points on this tapered portion, or a predetermined area thereof, make contact with the spherical bodies.

4. The actuator according to claim 1, wherein the fixed portion contact walls and the movable portion contact walls respectively protrude in mutually opposite directions essentially tangential to the perimeter of a circle centered on the optical axis.

5. The actuator according to claim 1, wherein the fixed portion drop prevention walls and the fixed portion contact walls, as well as the movable portion drop prevention walls and the movable portion contact walls, are respectively formed in a teardrop shape.

6. A lens unit comprising:
a lens barrel;
a plurality of imaging lenses housed inside the lens barrel; and
the actuator according to claim 1, wherein a portion of these imaging lenses are attached to the movable portion.

7. A camera comprising:
a camera main unit; and
the lens unit according to claim 6.

8. An actuator for moving an imaging lens within a plane perpendicular to the optical axis thereof to prevent blurring of an image, comprising:
a fixed portion;
a movable portion to which the imaging lens is attached;
at least three spherical bodies, sandwiched between the movable portion and the fixed portion and supporting the movable portion so that the movable portion is able to move;
a drive means for translationally and rotationally moving the movable portion with respect to the fixed portion;
fixed portion rolling area demarcation walls provided on the fixed portion so as to surround each of the respective spherical bodies, and to demarcate the rolling area within which the spherical bodies can roll in any direction;
movable portion rolling area demarcation walls provided on the movable portion so as to surround each of the respective spherical bodies, and to demarcate the rolling area within which the spherical bodies can roll in any direction;
at least two fixed portion restricted area demarcation walls formed to connect with the fixed portion rolling area, extending essentially tangentially relative to a circle centered on the optical axis and demarcating the positionally restricted area restricting the distance from the optical axis to the spherical bodies to a predetermined distance; and
movable portion restricted area demarcation walls, corresponding to the respective fixed portion restricted area demarcation walls, for demarcating a positionally restricted area extending essentially tangentially to a circle centered on the optical axis so as to connect to the movable portion rolling area.

9. The actuator according to claim 8, further comprising fixed portion adjustment area demarcation walls demarcating a line-shaped fixed portion adjustment area extending from and connected to the fixed portion rolling area, and movable portion adjustment area demarcation walls demarcating a line-shaped movable portion adjustment area connected to and extending from the movable portion rolling area; whereby at least either the fixed portion adjustment area or the movable portion adjustment area intersects the perimeter of a circle centered on the optical axis.

10. The actuator according to claim 9, wherein three sets of the fixed portion rolling area demarcation walls and the movable portion rolling area demarcation walls are formed; positionally restricted areas are formed in at least two such sets, and the fixed portion adjustment area and movable portion adjustment area are formed in the other set.

11. The actuator according to claim 8, wherein a surface contacting the spherical bodies and surrounded by the fixed portion restricted area demarcation walls or the movable portion restricted area demarcation walls has a curved surface with essentially the same curvature radius as the surface of the spherical bodies.

12. The actuator according to claim 8, further comprising a rotational locking means which, when the spherical bodies are positioned in the positionally restricted areas of the fixed portion and the movable portion, locks rotation of the movable portion relative to the fixed portion.

13. A lens unit comprising:
a lens barrel;
a plurality of imaging lenses housed within the lens barrel; and
the actuator according to claim 8, wherein a portion of these imaging lenses are attached to the movable portion.

14. A camera comprising:
a camera main unit; and
the lens unit according to claim 13.

* * * * *